United States Patent
Kawahara et al.

(10) Patent No.: US 11,824,583 B2
(45) Date of Patent: Nov. 21, 2023

(54) CYCLIC WAVELENGTH BAND REPLACEMENT DEVICE, MULTI-BAND TRANSMISSION SYSTEM, AND CYCLIC WAVELENGTH BAND REPLACEMENT METHOD

(71) Applicant: Nippon Telegraph and Telephone Corporation, Tokyo (JP)

(72) Inventors: Hiroki Kawahara, Musashino (JP); Takeshi Seki, Musashino (JP); Sachio Suda, Musashino (JP); Kohei Saito, Musashino (JP); Kenta Hirose, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/794,426

(22) PCT Filed: Feb. 4, 2020

(86) PCT No.: PCT/JP2020/004096
§ 371 (c)(1),
(2) Date: Jul. 21, 2022

(87) PCT Pub. No.: WO2021/156932
PCT Pub. Date: Aug. 12, 2021

(65) Prior Publication Data
US 2023/0074213 A1    Mar. 9, 2023

(51) Int. Cl.
*H04B 10/00* (2013.01)
*H04B 10/2537* (2013.01)
(Continued)

(52) U.S. Cl.
CPC ....... *H04B 10/2537* (2013.01); *H04B 10/506* (2013.01); *H04J 14/0209* (2013.01)

(58) Field of Classification Search
CPC .............. H04B 10/291; H04B 10/2912; H04B 10/2916; H04B 10/2935; H04B 10/294; H04B 10/2941; H04B 10/2942
See application file for complete search history.

(56) References Cited

U.S. PATENT DOCUMENTS

2020/0059313 A1   2/2020   Kato et al.
2022/0077949 A1*  3/2022   Kato ............... H04B 10/07955

FOREIGN PATENT DOCUMENTS

| JP | 2001274750 |   | 10/2001 |
|----|------------|---|---------|
| JP | 2001274750 | A * | 10/2001 |
| JP | 2018191074 |   | 11/2018 |

OTHER PUBLICATIONS

Semrau et al., "Achievable rate degradation of ultra-wideband coherent fiber communication systems due to stimulated Raman scattering." Optics Express, 2017, 25(12):13024-13034.
(Continued)

*Primary Examiner* — Daniel G Dobson
(74) *Attorney, Agent, or Firm* — Fish & Richardson P.C.

(57) ABSTRACT

A cyclic wavelength band permutation device (31) includes as many wavelength band converters (32a to 32c) as the wavelength bands of optical signals (S1, C1, and L1), and the wavelength band converters are individually connected to the output terminals of corresponding optical amplifiers among a plurality of optical amplifiers (17a to 17c) connected to an optical fiber (16) in an inserted manner. When a wavelength-multiplexed signal beam obtained by multiplexing optical signals in different wavelength bands is multiband-transmitted through an optical fiber while being amplified by the plurality of optical amplifiers, each wavelength band converter performs a cyclic permutation process of transitioning or converting an optical signal allocated to the shorter wavelength band side in the bands of the optical fiber to the longer wavelength band side, and also transi-
(Continued)

tioning or converting an optical signal allocated to the longest wavelength band to the shortest wavelength band.

10 Claims, 28 Drawing Sheets

(51) Int. Cl.
*H04B 10/50* (2013.01)
*H04J 14/02* (2006.01)
*H04J 14/00* (2006.01)

(56) References Cited

OTHER PUBLICATIONS

Wang et al., "Abrupt and Asymptotic Transience in DWDM Systems Using Backward-Pumped Fiber Raman Amplifier," IEEE Photonics Technology Letters, 2002, 14(9):1264-1266.

* cited by examiner

CYCLIC WAVELENGTH BAND REPLACEMENT DEVICE, MULTI-BAND TRANSMISSION SYSTEM, AND CYCLIC WAVELENGTH BAND REPLACEMENT METHOD

CROSS-REFERENCE TO RELATED APPLICATIONS

This application is a National Stage application under 35 U.S.C. § 371 of International Application No. PCT/JP2020/004096, having an International Filing Date of Feb. 4, 2020. The disclosure of the prior application is considered part of the disclosure of this application, and is incorporated by reference in its entirety into this application.

TECHNICAL FIELD

The present invention relates to a cyclic wavelength band permutation device used for multiband transmission in which optical signals in different wavelength bands are transmitted through an optical fiber by being multiplexed, a multiband transmission system, and a cyclic wavelength band permutation method.

BACKGROUND ART

FIG. 20 illustrates the configuration of a conventional multiband transmission system (also referred to as a system) that performs multiband transmission using an optical fiber as a transmission channel. Optical signals in different wavelength bands for use in multiband transmission are sequentially allocated to the bands of an optical fiber 16 from the shorter wavelength band side to the longer wavelength band side. In this example, the wavelength bands of optical signals include the following three types (in order from the shorter wavelength side): an S-band in the range of 1460 nm to 1530 nm, a C-band in the range of 1530 nm to 1565 nm, and an L-band in the range of 1565 nm to 1625 nm. Thus, S-band, C-band, and L-band optical signals are respectively allocated to the corresponding S-band, C-band, and L-band of the optical fiber 16.

A system 10 illustrated in FIG. 20 includes on its transmission side n optical transmitters 11a, 11b, ..., 11n that handle S-band optical signals, n optical transmitters 12a, 12b, ..., 12n that handle C-band optical signals, n optical transmitters 13a, 13b, ..., 13n that handle L-band optical signals, and a plurality of (three in this example) MUXs (multiplexers) 14a, 14b, and 14c.

It should be noted that the three MUXs 14a to 14c may be a single MUX connected to each of the output terminals of the S-band optical transmitters 11a to 11n, the C-band optical transmitters 12a to 12n, and the L-band optical transmitters 13a to 13n.

The output terminals of the S-band optical transmitters 11a to 11n are optically connected to the input terminals of the MUX 14a using optical transmission channels, such as optical fibers. The output terminals of the C-band optical transmitters 12a to 12n are optically connected to the input terminals of the MUX 14b. The output terminals of the L-band optical transmitters 13a to 13n are optically connected to the input terminals of the MUX 14c. The output terminals of the MUXs 14a to 14c are optically connected to the input terminals of a wavelength band multiplexer 15a1 via three optical amplifiers 17t1 to 17t3 that are connected to the respective output terminals of the MUXs 14a to 14c.

It should be noted that the three optical amplifiers 17t1 to 17t3 are also referred to as optical amplifiers 17t.

In addition, the system 10 includes on its reception side a wavelength band separator 15b4, a plurality of (three) DEMUXs (demultiplexers) 18a, 18b, and 18c, n optical receivers 21a, 21b, ..., 21n that handle S-band optical signals, n optical receivers 22a, 22b, ..., 22n that handle C-band optical signals, and n optical receivers 23a, 23b, ..., 23n that handle L-band optical signals.

Three output terminals of the wavelength band separator 15b4 are optically connected to the respective input terminals of the DEMUXs 18a to 18c. The output terminals of the DEMUX 18a are optically connected to the respective input terminals of the S-band optical receivers 21a to 21n. The output terminals of the DEMUX 18b are optically connected to the respective input terminals of the C-band optical receivers 22a to 22n. The output terminals of the DEMUX 18c are optically connected to the respective input terminals of the L-band optical receivers 23a to 23n.

It should be noted that the three DEMUXs 18a to 18c may be a single DEMUX connected to each of the input terminals of the S-band optical transmitters 21a to 21n, the C-band optical transmitters 22a to 22n, and the L-band optical transmitters 23a to 23n.

Further, the system 10 includes the optical fiber 16 as an optical transmission channel connected between the wavelength band multiplexer (also referred to as a multiplexer) 15a1 on the transmission side and the wavelength band separator (also referred to as a separator) 15b4 on the reception side that are located remote from each other. The optical fiber 16 has connected thereto separators 15b1, 15b2, and 15b3, multiplexers 15a2, 15a3, and 15a4, optical amplifiers 17a1 to 17a3, optical amplifiers 17b1 to 17b3, and optical amplifiers 17c1 to 17c3. It should be noted that the optical amplifiers 17a1 to 17a3 are also referred to as optical amplifiers 17a, the optical amplifiers 17b1 to 17b3 are also referred to as optical amplifiers 17b, and the optical amplifiers 17c1 to 17c3 are also referred to as optical amplifiers 17c.

That is, three optical amplifiers 17a1 to 17a3 are connected in parallel between the separator 15b1 and the multiplexer 15a2. Three optical amplifiers 17b1 to 17b3 are connected in parallel between the separator 15b2 and the multiplexer 15a3. Three optical amplifiers 17c1 to 17c3 are connected in parallel between the separator 15b3 and the multiplexer 15a4.

Hereinafter, the optical amplifiers 17t on the output side of the MUXs 14a to 14c shall also be referred to as optical amplifiers 17t on the transmission side. In addition, the optical amplifiers on the transmission channel of the optical fiber 16 are also referred to as first optical amplifiers 17a, second optical amplifiers 17b, and third optical amplifiers 17c in this order from the transmission side, and such optical amplifiers are also referred to as optical amplifiers 17a1 to 17c3.

On the transmission side, the S-band optical transmitters 11a to 11n transmit S-band optical signals with different wavelengths. The transmitted S-band optical signals are multiplexed by the MUX 14a, and the resulting signal is amplified by the optical amplifier 17t1 and is then output to the wavelength band multiplexer 15a1.

The C-band optical transmitters 12a to 12n transmit C-band optical signals with different wavelengths. The transmitted C-band optical signals are multiplexed by the MUX 14b, and the resulting signal is amplified by the optical amplifier 17t2 and is then output to the wavelength band multiplexer 15a1.

The L-band optical transmitters 13a to 13n transmit L-band optical signals with different wavelengths. The transmitted L-band optical signals are multiplexed by the MUX 14c, and the resulting signal is amplified by the optical amplifier 17t3 and is then output to the wavelength band multiplexer 15a1. It should be noted that each of the S-band, C-band, and L-band optical signals includes traffic, such as user data.

The wavelength band multiplexer 15a1 sequentially multiplexes the input S-band, C-band, and L-band optical signals from the shorter wavelength side to the longer wavelength side of the bands of the optical fiber 16, and performs multiband transmission of the resulting wavelength-multiplexed signal beam 1a through the optical fiber 16. It should be noted that the wavelength band multiplexer 15a1 may be an optical coupler that multiplexes the S-band, C-band, and L-band optical signals.

The wavelength-multiplexed signal beam that is multiband-transmitted through the optical fiber 16 from the wavelength band multiplexer 15a is sequentially amplified by the optical amplifiers 17a1 to 17c3, and is then received by the corresponding S-band optical receivers 21a to 21n, C-band optical receivers 22a to 22n, and L-band optical receivers 23a to 23n via the wavelength band separator 15b4 on the reception side and the DEMUXs 18a to 18c.

Specifically, on the reception side, the wavelength band separator 15b4 separates the wavelength-multiplexed signal beam into S-band, C-band, and L-band optical signals, and then outputs the S-band optical signal to the DEMUX 18a, outputs the C-band optical signal to the DEMUX 18b, and outputs the L-band optical signal to the DEMUX 18c. It should be noted that the wavelength band separator 15b4 may be an optical coupler that separates the S-band optical signal, the C-band optical signal, and the L-band optical signal from each other.

The DEMUX 18a demultiplexes the S-band wavelength-multiplexed signal into optical signals with different wavelengths in the S-band, and outputs the resulting signals to the corresponding S-band optical receivers 21a to 21n. The DEMUX 18b demultiplexes the C-band wavelength-multiplexed signal into optical signals with different wavelengths in the C-band, and outputs the resulting signals to the corresponding C-band optical receivers 22a to 22n. The DEMUX 18c demultiplexes the L-band wavelength-multiplexed signal into optical signals with different wavelengths in the L-band, and outputs the resulting signals to the corresponding L-band optical receivers 23a to 23n.

In such multiband transmission through the optical fiber 16, energy transition occurs due to stimulated Raman scattering. Such energy transition will be described with reference to FIG. 21. FIG. 21 is a Raman spectrum chart in which the ordinate axis indicates the Raman gain coefficient and the abscissa axis indicates the frequency difference between a pump beam (e.g., an excitation beam) and a signal beam.

As illustrated in FIG. 21, when the frequency difference is zero, the Raman gain coefficient is zero. Thus, energy transition does not occur. As indicated by a slanting line e1, as the frequency difference, that is, the wavelength difference gradually becomes larger, the Raman gain coefficient becomes larger correspondingly, and the amount of energy transition increases. When the frequency difference is about 12 THz, that is, when the wavelength difference is about 100 nm, the Raman gain coefficient becomes the maximum, and the amount of energy transition reaches a peak. When the wavelength difference exceeds about 100 nm, energy transition does not occur and the Raman gain coefficient is zero, and thus, the amount of energy transition is zero. That is, when the wavelength difference is less than or equal to 100 nm, energy transition occurs in the direction from a short-wavelength optical signal to a long-wavelength optical signal.

In the system 10 illustrated in FIG. 20, the wavelength-multiplexed signal beam 1a output from the wavelength band multiplexer 15a1 includes an S-band optical signal S1, a C-band optical signal C1, and an L-band optical signal L1 each having equal power P5 as illustrated in a signal spectrum chart of FIG. 22.

Meanwhile, in a wavelength-multiplexed signal beam 1b output from the wavelength band multiplexer 15a2 on the output side of the first optical amplifiers 17a of the system 10, energy transition occurs in the direction from a shorter-wavelength optical signal to a longer-wavelength optical signal as indicated by arrow Y11 in FIG. 23.

Energy transition occurs while optical signals are transmitted through the optical fiber 16. However, energy transition hardly occurs in any of the optical amplifiers 17a since the optical amplifiers 17a amplify the power of optical signals such that energy transition does not occur. Thus, in the present example, it is defined that energy transition only occurs in the optical fiber 16.

Therefore, as illustrated in FIG. 23, the optical power P5a of the wavelength-multiplexed signal 1b on the output side of the optical amplifiers 17a is used as a reference, and the power of each of optical signals S2, C2, and L2, which have undergone energy transition, indicated by left-to-right upward slanting lines passes through the central point of the wavelength band of the power P5a.

That is, due to the energy transition, the power of the shorter-wavelength optical signal becomes lower and the power of the longer-wavelength optical signal becomes higher. Consequently, the power of each of the optical signals S2, C2, and L2 becomes higher in an upward slanting manner from power P3, which is lower than the power P5a, to power P7, which is higher than the power P5a. Thus, power deviation 41 occurs between the power P3 and the power P7. Likewise, energy transition occurs in a cumulative manner in second and third wavelength-multiplexed signal beams 1c and 1d, and power deviation becomes larger correspondingly.

Therefore, the wavelength-multiplexed signal beam 1d output from the third optical amplifiers 17c via the wavelength band multiplexer 15a4 has the largest cumulative amount of energy transition as illustrated in FIG. 24. Consequently, the power of each of optical signals S3, C3, and L3 becomes higher in an upward slanting manner from power P2, which is lower than the power P3, to power P8, which is higher than the power P7. The wavelength-multiplexed signal beam 1d in such a state is input to the wavelength band separator 15b4.

Therefore, power deviation 42 between the minimum power P2 of the S-band optical signal S3 and the maximum power P8 of the L-band optical signal L3 illustrated in FIG. 24 is larger than the power deviation 41 between the minimum power P3 of the S-band short-wavelength optical signal S2 and the maximum power P7 of the L-band long-wavelength optical signal L2 illustrated in FIG. 23.

Regarding the wavelength-multiplexed signal beam 1d output from the third optical amplifiers 17c1 to 17c3 via the wavelength band multiplexer 15a4, as illustrated in FIG. 24, OSNR (Optical Signal to Noise Ratio) of the optical signals S3 and C3 on the shorter wavelength side, which have power lower than the power P5 on the transmission side (FIG. 22) after the transmission, degrades more as compared to OSNR of signals without the aforementioned energy transition after the transmission. Thus, the transmittable distance of the optical signals S3 and C3 arranged in such a region or the transmittable channel capacity decreases.

Meanwhile, regarding the wavelength-multiplexed signal beam 1d on the reception side, as illustrated in FIG. 24, OSNR of the optical signals L3 and C3 on the longer wavelength side, which have power higher than the power P5 on the transmission side after the transmission, improves more as compared to OSNR of signals without the aforementioned energy transition after the transmission. However, since the optical signals L3 and C3 degrade due to self-phase modulation or cross-phase modulation, for example, that occurs along with transmission with high signal beam power, the transmittable distance of the optical signals L3 and C3 arranged in such a region or the transmittable channel capacity decreases.

To suppress such a decrease in the transmittable distance or the transmission capacity, WSSs (Wavelength Selective Switches) are connected as illustrated in a system 10A of FIG. 25. That is, WSSs 19t1 to 19t3 are connected to the respective input terminals of the optical amplifiers 17t1 to 17t3 on the transmission side. Further, WSSs 19a1 to 19a3 are connected to the respective input terminals of the first optical amplifiers 17a1 to 17a3, and WSSs 19b1 to 19b3 are connected to the respective input terminals of the second optical amplifiers 17b1 to 17b3.

It should be noted that the WSSs 19t1 to 19t3, the WSSs 19a1 to 19a3, and the WSSs 19b1 to 19b3 may be connected to the respective output terminals of the optical amplifiers 17t1 to 17t3 and the optical amplifiers 17a1 to 17b3.

When the aforementioned energy transition occurs, for example, as illustrated in FIG. 24, the power of the wavelength-multiplexed signal beam 1d that has been transmitted through the optical fiber 16 has spectral characteristics (i.e., receiving spectral characteristics) such that the power gradually becomes higher from the shorter wavelength side to the longer wavelength side.

Herein, the WSSs 19t on the transmission side perform a pre-emphasis process of, as indicated by downward slanting lines S1a, C1a, and L1a of FIG. 26, providing power with characteristics opposite to the aforementioned spectral characteristics (i.e., opposite spectral characteristics) to the wavelength-multiplexed signal beam 1a output from the optical amplifiers 17t1 to 17t3 via the wavelength band multiplexer 15a.

That is, through the pre-emphasis process, the power of the wavelength-multiplexed signal beam 1a on the transmission side is allowed to have the opposite spectral characteristics such that the power gradually becomes lower in a downward slanting manner from the shorter wavelength side to the longer wavelength side, as indicated by the downward slanting lines S1a, C1a, and L1a of FIG. 26. The downward slanting lines indicating the opposite spectral characteristics pass through the central point of the flat line of the power P5 in a region from the shorter wavelength side to the longer wavelength side when the pre-emphasis process is not performed, and the total power of the opposite spectral characteristics is equal to the power P5 indicated by the flat line. In addition, power deviation Δx occurs between the upper and lower ends of the downward slanting lines.

When the wavelength-multiplexed signal beam 1a indicated by the downward slanting lines is transmitted through the optical fiber 16 to a point immediately before the next WSSs 19a, the power becomes flat due to energy transition as illustrated in FIG. 27, and thus, the power deviation Δx is eliminated. The power herein is P2 that is lower than the power P5. The power P2 is amplified up to the power P5 by the next optical amplifiers 17a, but before being amplified, the power P2 is subjected to a pre-emphasis process with the WSSs 19a1 to 19a3. Hereinafter, a pre-emphasis process is similarly performed with the WSSs 19b1 to 19b3 so that the power becomes the flat power P2 due to energy transition.

The power P2 is amplified up to the power P5 by the optical amplifiers 17c on the final stage, and the resulting wavelength-multiplexed signal beam 1d is output from the wavelength band multiplexer 15a4. The wavelength-multiplexed signal beam 1d has the power P5 with flat spectral characteristics without power deviation like the wavelength-multiplexed signal beam on the transmission side (see FIG. 22). Since the power deviation is eliminated, after the S-band optical signal on the shorter wavelength side is transmitted, signal quality improves due to the improved OSNR, and also, signal quality improves due to mitigated self-phase modulation or cross-phase modulation of the L-band optical signal on the longer wavelength side. Consequently, a decrease in the transmittable distance or the transmittable channel capacity is suppressed.

Besides, there is also known the configuration of a multiband transmission system that performs a gain equalization process for obtaining flat power using WSSs. FIG. 28 illustrates a system 10B. In the system 10B, MUXs 14a to 14c are respectively connected to optical amplifiers 17t1 to 17t3. WSSs 19d1 to 19d3 are connected to the respective input terminals of first optical amplifiers 17a1 to 17a3 on the optical fiber 16. WSSs 19e1 to 19e3 are connected to the respective input terminals of second optical amplifiers 17b1 to 17b3. WSSs 19f1 to 19f3 are connected to the respective input terminals of third optical amplifiers 17c1 to 17c3.

It should be noted that the WSSs 19d1 to 19d3, the WSSs 19e1 to 19e3, and the WSSs 19f1 to 19f3 may be connected to the respective output terminals of the optical amplifiers 17a1 to 17c3.

The WSSs 19d1 to 19d3 perform a gain equalization process of changing the power of a wavelength-multiplexed signal beam, which has been inclined in an upward slanting manner due to energy transition while being transmitted through the optical fiber 16 as illustrated in FIG. 23, into the flat power P2 as illustrated in FIG. 27, for example. The wavelength-multiplexed signal beam with the power P2 is amplified to have the power P5 by the optical amplifiers 17a1 to 17a3 on the following stage as illustrated in FIG. 22, for example.

Thereafter, such a gain equalization process is repeated by the WSSs 19e1 to 19e3 and the WSS 19f1 to 19f3. Thus, the wavelength-multiplexed signal beam 1d output from the optical amplifiers 17c on the final stage has the power P5 with flat spectral characteristics without power deviation like the wavelength-multiplexed signal beam on the transmission side (see FIG. 22). Through such a gain equalization process, degradation in the quality of optical signals, which would occur due to degradation factors such as self-phase modulation or cross-phase modulation, can be suppressed.

The conventional art of performing such a pre-emphasis process or a gain equalization process is described in Non-Patent Literature 1 and Non-Patent Literature 2.

CITATION LIST

Non-Patent Literature

Non-Patent Literature 1: D. SEMRAU et al., "Achievable rate degradation of ultra-wideband coherent fiber communication systems due to stimulated Raman scattering," Opt. Exp. Vol. 25, no. 12, 2017.

Non-Patent Literature 2: S. Wang et al., "Abrupt and Asymptotic Transience in DWDM Systems Using Backward-Pumped Fiber Raman Amplifier," IEEE Photon. Technol. Lett. Vol. 14, no. 8, 2002.

SUMMARY OF THE INVENTION

Technical Problem

However, in the aforementioned pre-emphasis process, setting of the attenuation amount for each of the channels of the WSSs 19d1 to 19f3 is implemented through electrical control. Thus, setting of the attenuation amount based on the electrical control speed of the WSSs 19a cannot follow the amount of dynamic power fluctuation that occurs at the optical response speed when an optical signal is added (inserted) or drops (is removed). Therefore, there has been a problem in that degradation in the quality of signals due to instantaneous power fluctuation is unavoidable.

The present invention has been made in view of the foregoing circumstances, and it is an object of the present invention to, when multiband transmission is performed using an optical fiber, avoid degradation in the quality of optical signals due to power deviation resulting from stimulated Raman scattering.

Means for Solving the Problem

To solve the aforementioned problem, a cyclic wavelength band permutation device according to the present invention includes, when a wavelength-multiplexed signal beam obtained by multiplexing optical signals in different wavelength bands is multiband-transmitted through an optical fiber while being amplified by a plurality of optical amplifiers, as many wavelength band converters as the wavelength bands of the optical signals, each wavelength band converter being configured to perform a cyclic permutation process of transitioning or converting an optical signal allocated to the shorter wavelength band side in the bands of the optical fiber to the longer wavelength band side, and also transitioning or converting an optical signal allocated to the longest wavelength band to the shortest wavelength band, and each wavelength band converter being individually connected to output terminals of corresponding optical amplifiers among the plurality of optical amplifiers.

Effect of the Invention

According to the present invention, it is possible to, when multiband transmission is performed using an optical fiber, avoid degradation in the quality of optical signals due to power deviation resulting from stimulated Raman scattering.

DESCRIPTION OF EMBODIMENT

Hereinafter, an embodiment of the present invention will be described with reference to the drawings. It should be noted that throughout the drawings of this specification, portions with corresponding functions are denoted by identical reference signs, and description thereof is omitted as appropriate.
<Configuration of Embodiment>
FIG. 1 is a block diagram illustrating the configuration of a multiband transmission system including a cyclic wavelength band permutation device according to an embodiment of the present invention.

Figure 1:
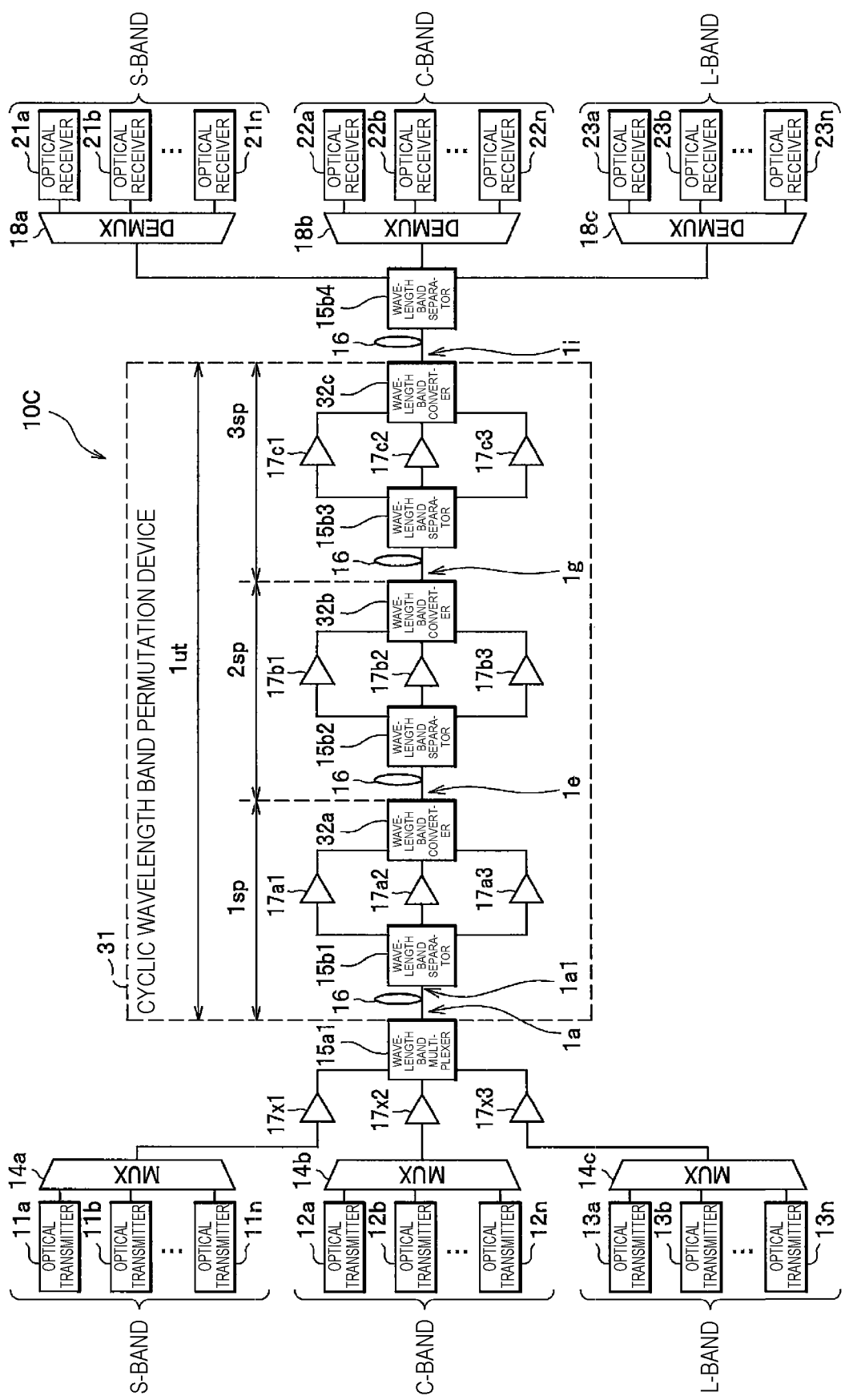
FIG. 1 is a block diagram illustrating the configuration of a multiband transmission system including a cyclic wavelength band permutation device according to an embodiment of the present invention.
Figure 20:
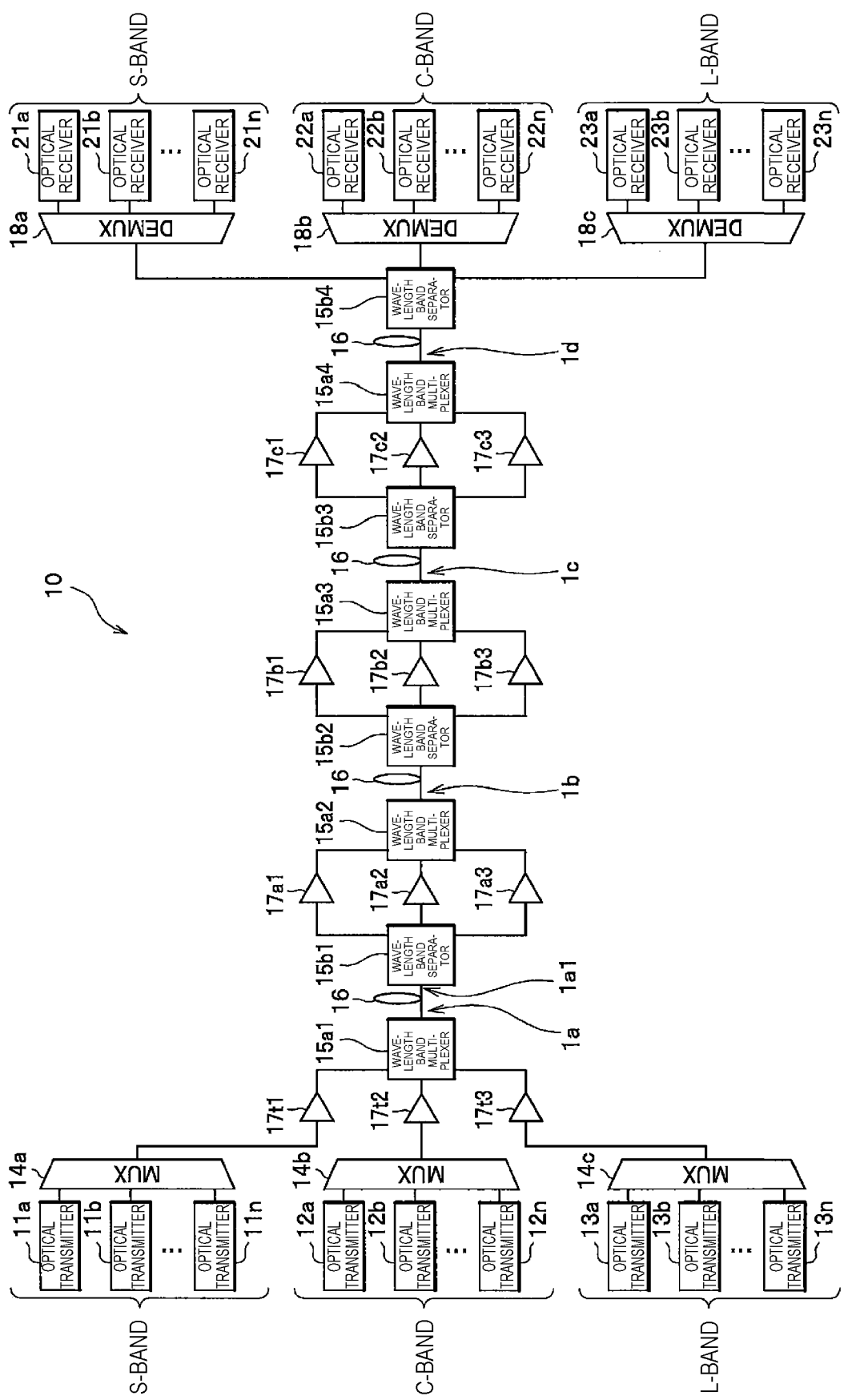
FIG. 20 is a block diagram illustrating the configuration of a conventional multiband transmission system.
Figure 21:
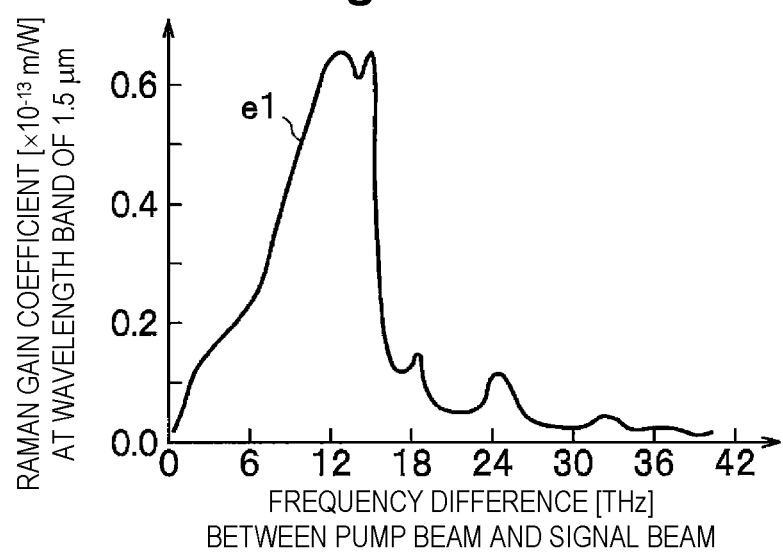
FIG. 21 is a Raman spectrum chart in which the ordinate axis indicates the Raman gain coefficient and the abscissa axis indicates the wavelength difference between a pump beam and an optical signal that is away from the pump beam toward the longer wavelength side.
Figure 22:
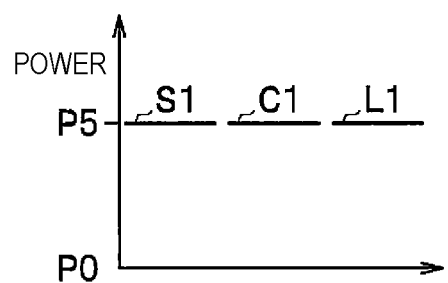
FIG. 22 is a wavelength spectrum chart of each of S-band, C-band, and L-band optical signals of a wavelength-multiplexed signal beam from a conventional wavelength band multiplexer.
Figure 23:
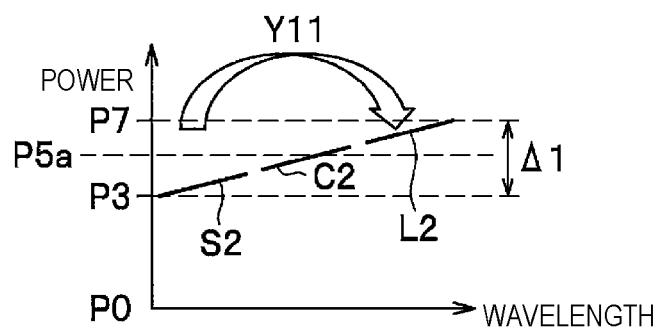
FIG. 23 is a wavelength spectrum chart of each optical signal when energy transition occurs due to stimulated Raman scattering according to a conventional example.
Figure 24:
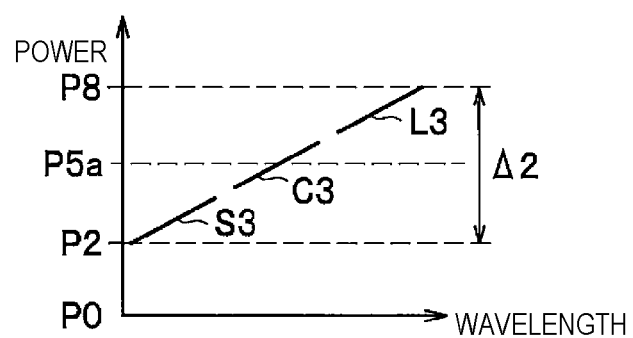
FIG. 24 is a spectrum chart of the wavelength band of each optical signal on the output side of a conventional third optical amplifier.
Figure 25:
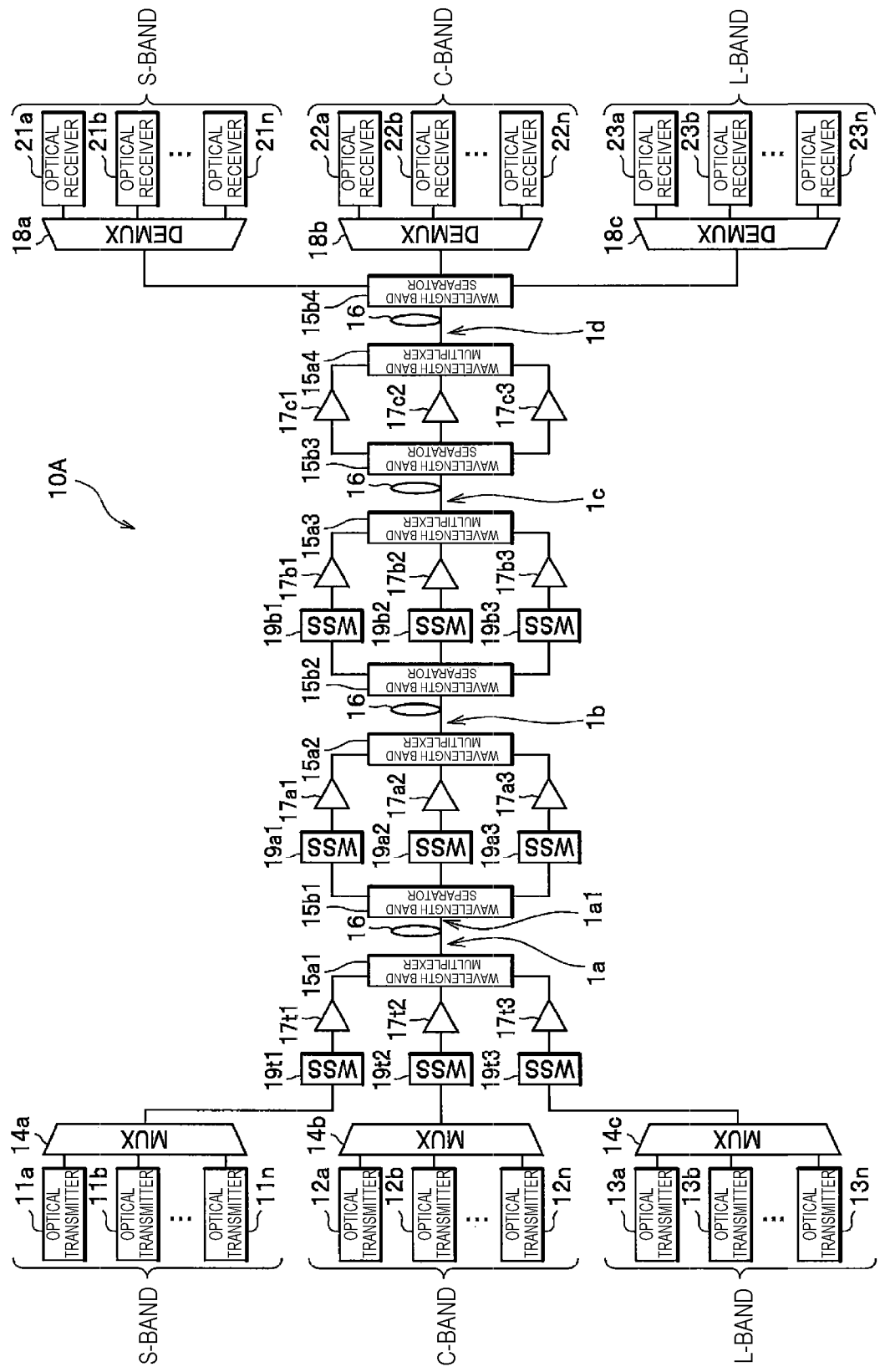
FIG. 25 is a block diagram illustrating the configuration of a conventional multiband transmission system that performs a pre-emphasis process.
Figure 26:
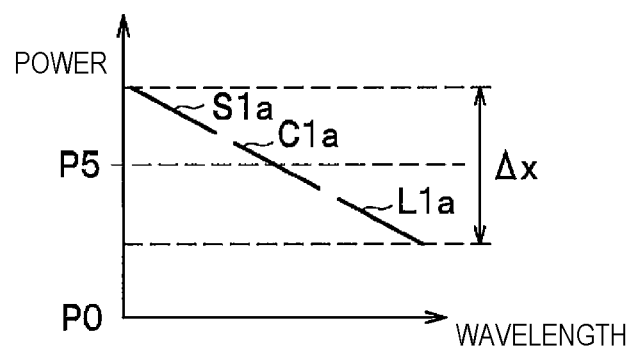
FIG. 26 is a wavelength spectrum chart illustrating characteristics opposite to the spectral characteristics on the reception side (i.e., opposite spectral characteristics) according to a conventional example.
Figure 27:
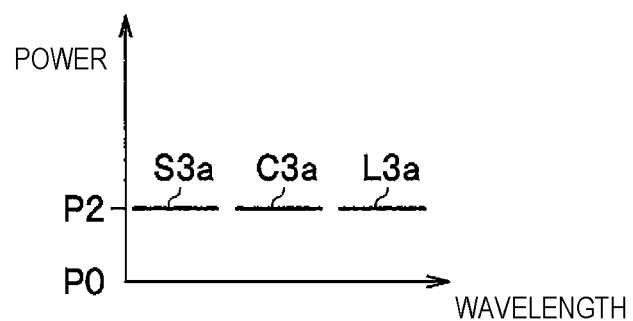
FIG. 27 is a wavelength spectrum chart of each optical signal that has been made flat in accordance with the minimum power using WSSs on the reception side according to a conventional example.
Figure 28:
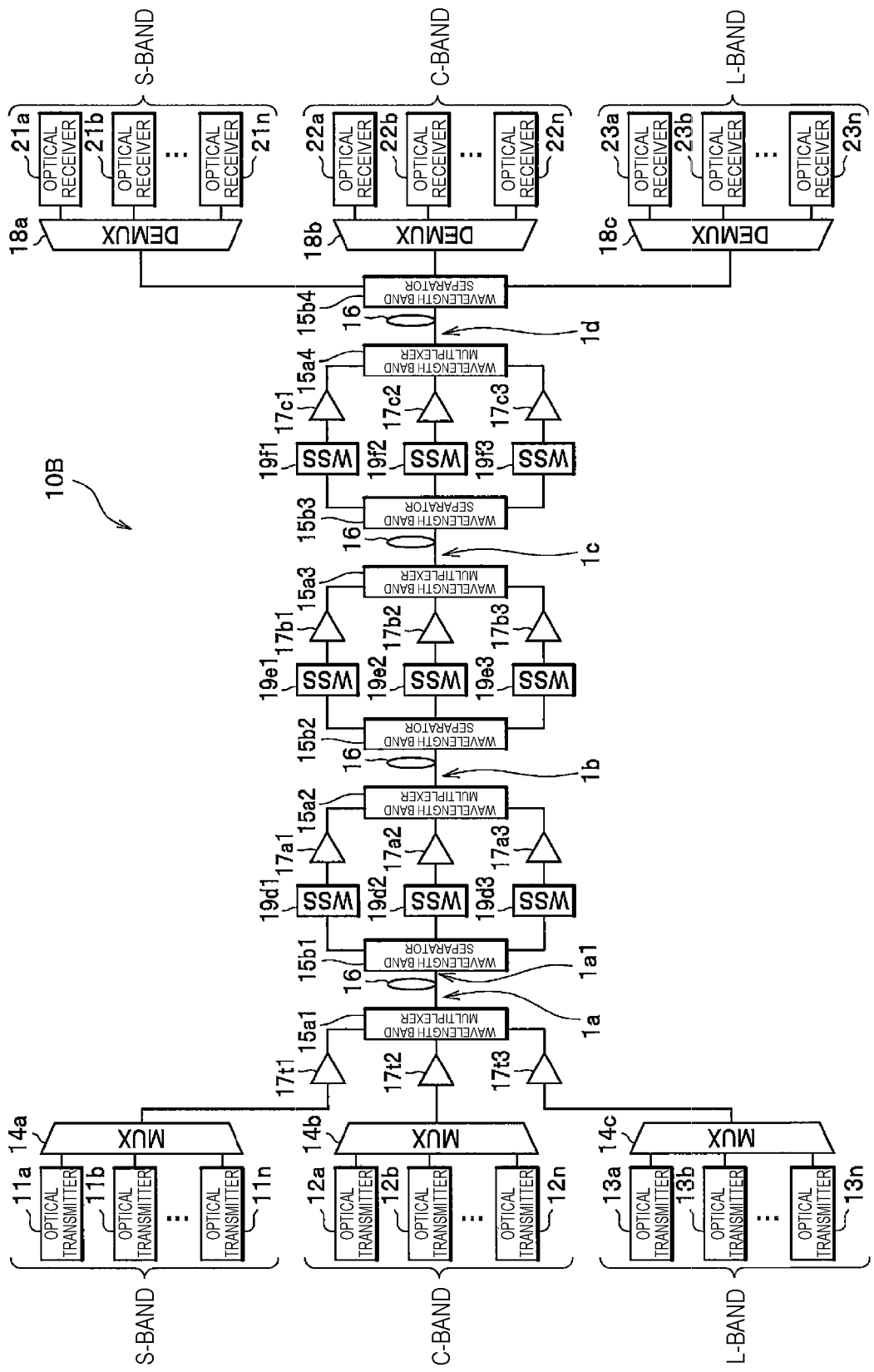
FIG. 28 is a block diagram illustrating the configuration of a conventional multiband transmission system that performs a gain equalization process.

A multiband transmission system (system) 10C illustrated in FIG. 1 differs from the conventional system 10 (FIG. 20) in that it includes a cyclic wavelength band permutation device 31 with a configuration in which wavelength band converters 32a, 32b, and 32c are respectively connected to the output sides of sets of optical amplifiers 17a1 to 17a3 (i.e., optical amplifiers 17a), optical amplifiers 17b1 to 17b3 (i.e., optical amplifiers 17b), and optical amplifiers 17c1 to 17c3 (i.e., optical amplifiers 17c). It should be noted that the number of the wavelength band converters 32a to 32c is the same as the number of different wavelength bands of optical signals of a wavelength-multiplexed signal beam 1a.

The cyclic wavelength band permutation device 31 performs the following cyclic wavelength band permutation process when the wavelength-multiplexed signal beam 1a, which has been obtained by multiplexing optical signals in different wavelength bands, is multiband-transmitted through an optical fiber 16 while being amplified by the plurality of sets of optical amplifiers 17a to 17c. That is, the cyclic wavelength band permutation process is a permutation process of transitioning all optical signals allocated to the respective wavelength bands to adjacent wavelength bands on the longer wavelength side, and also transitioning all optical signals allocated to the wavelength band on the longest wavelength side to the wavelength band on the shortest wavelength side, in the bands of the optical fiber 16.

Herein, it is assumed that in the initial state of transmission, optical signals in three types of wavelength bands, which include the S-band in the range of 1460 nm to 1530 nm, the C-band in the range of 1530 nm to 1565 nm, and the L-band in the range of 1565 nm to 1625 nm, are allocated to the respective bands of the optical fiber 16 in order from the shorter wavelength band side.

Figure 3:
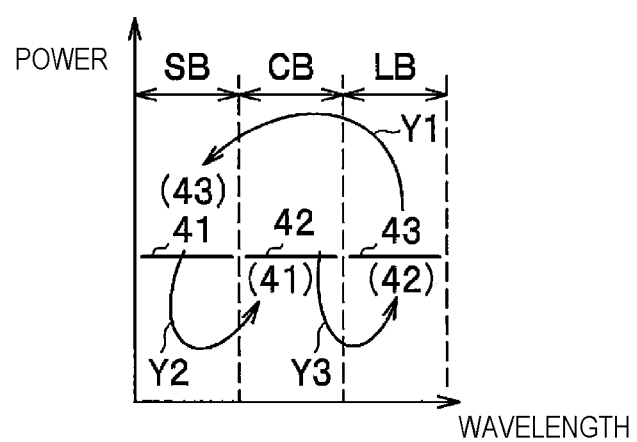
FIG. 3 is a wavelength spectrum chart for illustrating the operation of rearranging optical signals in different wavelength bands within the bands of an optical fiber using a wavelength band converter.

The bands (i.e., the S-band, the C-band, and the L-band) of the optical fiber 16 used in this example are respectively referred to as the S-band "SB" (see the S-band in FIG. 3), the C-band "CB," and the L-band "LB" illustrated in FIG. 3 in this order from the shorter wavelength band side to the longer wavelength band side. At the beginning of transmission, an S-band optical signal 41 of the wavelength-multiplexed signal beam 1a from a wavelength band multiplexer 15a1 is allocated to the S-band "SB," a C-band optical signal 42 is allocated to the C-band "CB," and an L-band optical signal 43 is allocated to the L-band "LB".

In the system 10C, the interval between the output terminal of the wavelength band multiplexer 15a1 and the output terminal of the first wavelength band converter 32a located in the direction of the reception side is a first span (1sp). The interval between the output terminal of the first wavelength band converter 32a and the output terminal of the second wavelength band converter 32b is a second span (2sp). The interval between the output terminal of the second wavelength band converter 32b and the output terminal of the third wavelength band converter 32c is a third span (3sp). The sum of the 1sp to the 3sp is a unit (1 ut) of a cyclic permutation process (described below). It should be noted that the number of spans in 1 ut is desirably equal to the number of wavelength bands.

Figure 2:
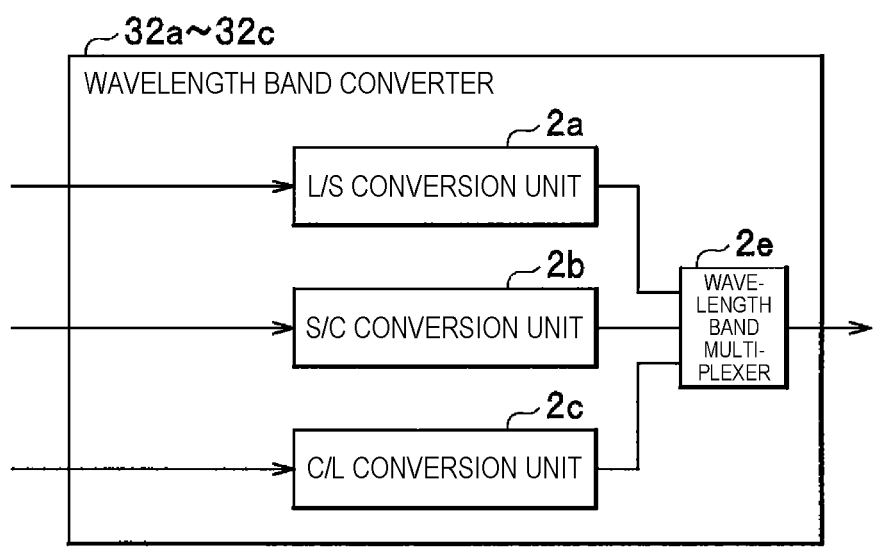
FIG. 2 is a block diagram illustrating the configuration of a wavelength band converter of an embodiment.

Each of the wavelength band converters 32a to 32c includes, as illustrated in FIG. 2, an L/S conversion unit 2a (i.e., a conversion unit 2a), an S/C conversion unit 2b (i.e., a conversion unit 2b), a C/L conversion unit 2c (i.e., a conversion unit 2c), and a wavelength band multiplexer (i.e., a multiplexer) 2e.

Each of the wavelength band converters 32a to 32c will be described using the wavelength band converter 32a in the first sp as a representative example.

In the wavelength band converter 32a, S-band to L-band optical signals amplified by the optical amplifiers 17a in the first sp are input to the corresponding conversion units 2a to 2c. That is, the L-band optical signal is output to the L/S conversion unit 2a, the S-band optical signal is output to the S/C conversion unit 2b, and the C-band optical signal is output to the C/L conversion unit 2c.

As illustrated in FIG. 3, the L/S conversion unit 2a transitions the L-band (L-band "LB") optical signal 43 to the S-band "SB" of the optical fiber 16 as indicated by arrow Y1, thereby converting the signal into an S-band optical signal 43.

The S/C conversion unit 2b transitions the S-band optical signal 41 to the C-band "CB" as indicated by arrow Y2, thereby converting the signal into a C-band optical signal 41.

The C/L conversion unit 2c transitions the C-band optical signal 42 to the L-band "LB" as indicated by arrow Y3, thereby converting the signal into an L-band optical signal 42.

In this manner, the wavelength band converter 32a performs a cyclic permutation process of rearranging S-band, C-band, and L-band optical signals in the S-band "SB," the C-band "CB," and the L-band "LB" of the optical fiber 16 in a cyclic manner with the conversion units 2a to 2c. The same holds true for the other wavelength band converters 32b and 32c.

The wavelength band multiplexer 2e illustrated in FIG. 2 multiplexes the S-band to L-band optical signals, which have been obtained through cyclic permutation with the conversion units 2a to 2c, and transmits the resulting wavelength-multiplexed signal beam to the reception side via the optical fiber 16.

Figure 4:
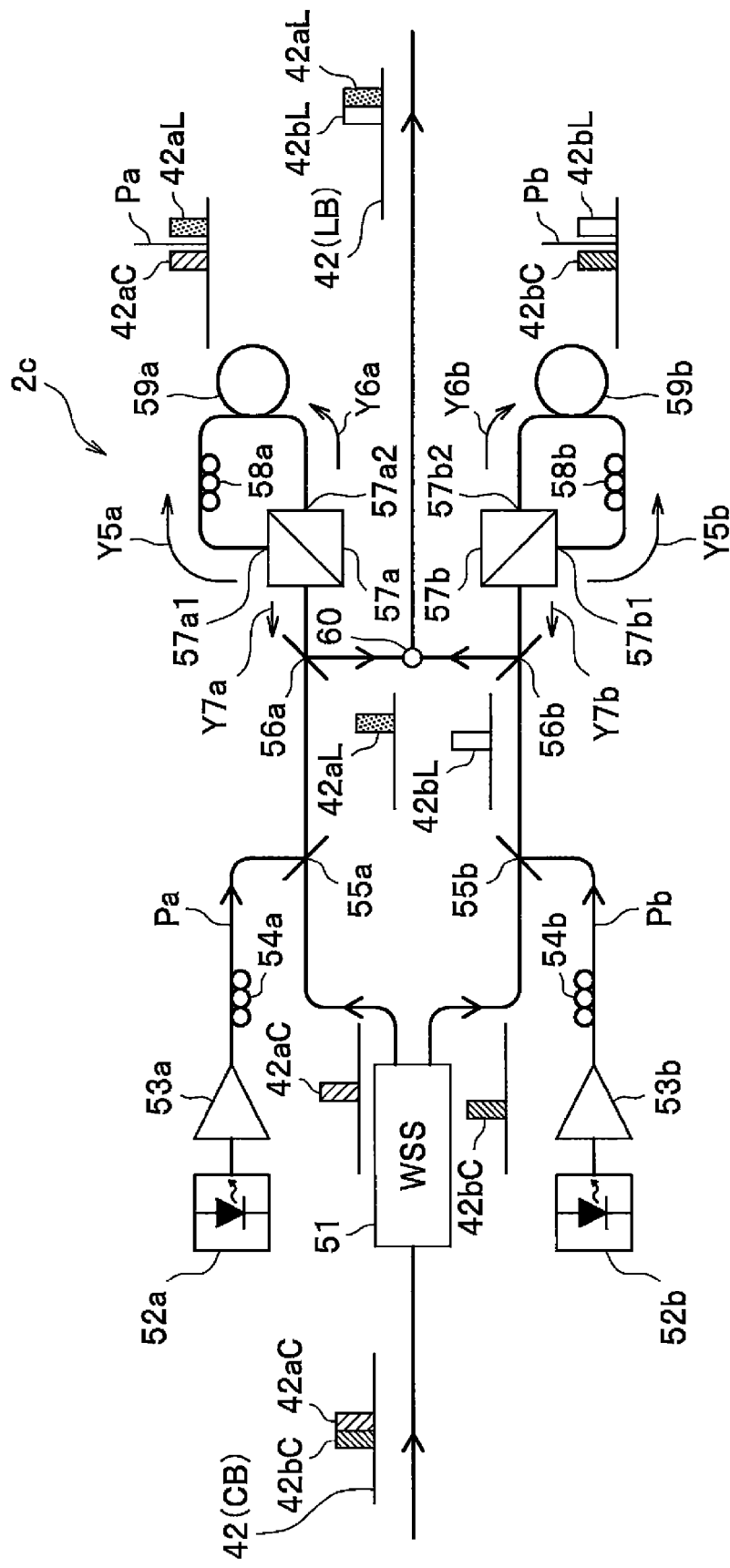
FIG. 4 is a circuit diagram illustrating the configuration of a wavelength band converter.

The L/S conversion unit 2a, the S/C conversion unit 2b, and the C/L conversion unit 2c have the same configuration. FIG. 4 illustrates the circuit configuration of the C/L conversion unit 2c as a representative example, which will be described below.

The C/L conversion unit 2c illustrated in FIG. 4 includes a WSS 51, variable-wavelength light sources 52a and 52b, amplifiers 53a and 53b, polarization controllers 54a and 54b, WDM (Wavelength Division Multiplexing) couplers 55a, 55b, 56a, and 56b, polarization beam splitters 57a and 57b, polarization controllers 58a and 58b, looped highly nonlinear fibers 59a and 59b, and an optical coupler 60.

It should be noted that among reference signs 52a to 59b, "a" indicates a component for the longer wavelength side of an optical signal, and "b" indicates a component for the shorter wavelength side of an optical signal.

The polarization beam splitter 57a has two input-output ports 57a1 and 57a2 connected in a loop by an optical fiber, and the looped highly nonlinear fiber 59a is connected to the optical fiber. Further, the polarization controller 58a is connected between one of the input-output ports: 57a1 of the polarization beam splitter 57a and the highly nonlinear fiber 59a.

Similarly, the polarization beam splitter 57b has two input-output ports 57b1 and 57b2 connected in a loop by an optical fiber, and the looped highly nonlinear fiber 59b is connected to the optical fiber. Further, the polarization controller 58b is connected between one of the input-output ports: 57b1 of the polarization beam splitter 57b and the highly nonlinear fiber 59b.

First, a pump beam output from the variable-wavelength light source 52a is amplified by the amplifier 53a, and is then polarization-controlled by the polarization controller 54a. The resulting pump beam Pa is input to the polarization beam splitter 57a via the WDM couplers 55a and 56a. At this time, the pump beam Pa is input to the polarization beam splitter 57a while being linearly polarized at 45 degrees with respect to the primary axis of the polarization beam splitter 57a. The inclination of 45 degrees is achieved through polarization control of the polarization controller 54a.

Similarly, a pump beam output from the variable-wavelength light source 52b is amplified by the amplifier 53b, and is then polarization-controlled by the polarization controller 54b. The resulting pump beam Pb is input to the polarization beam splitter 57b via the WDM couplers 55b and 56b. At this time, the pump beam Pb is input to the polarization beam splitter 57b while being linearly polarized at 45 degrees with respect to the primary axis of the polarization beam splitter 57b. The inclination of 45 degrees is achieved through polarization control of the polarization controller 54b.

Meanwhile, the C-band optical signal 42 from the optical amplifier 17a2 is input to the WSS 51. The C-band optical signal 42 is allocated to the C-band "CB" of the optical fiber 16, and includes a longer-wavelength-side optical signal 42aC and a shorter-wavelength-side optical signal 42bC that have been multiplexed.

The WSS 51 outputs the C-band optical signal 42 separately as the longer-wavelength-side optical signal 42aC and the shorter-wavelength-side optical signal 42bC. The longer-wavelength-side optical signal 42aC is input to the polarization beam splitter 57a via the WDM couplers 55a and 56a. The shorter-wavelength-side optical signal 42bC is input to the polarization beam splitter 57b via the WDM couplers 55b and 56b.

On the longer wavelength side with such a configuration, the longer-wavelength-side optical signal 42aC and the pump beam Pa input to the polarization beam splitter 57a are output from the first input-output port 57a1 of the polarization beam splitter 57a, and travel through a loop path to be input to the second input-output port 57a2 via the polarization controller 58a and the highly nonlinear fiber 59a as indicated by arrow Y5a.

In such a loop path, the longer-wavelength-side optical signal 42aC and the pump beam Pa output from the first input-output port 57a1 of the polarization beam splitter 57a are polarization-controlled by the polarization controller 58a, and a four-wave mixed beam is generated by the highly nonlinear fiber 59a. The highly nonlinear fiber 59a is an optical fiber with a high nonlinear constant, and efficiently generates a four-wave mixed beam in the loop. Thus, such a beam is used as a wavelength-band converted beam.

That is, the highly nonlinear fiber 59a generates a four-wave mixed beam through interaction between the longer-wavelength-side optical signal 42aC and the pump beam Pa, and newly generates an L-band longer-wavelength-side optical signal 42aL. The thus generated optical signal 42aL, the longer-wavelength-side optical signal 42aC, and the pump beam Pa are input to the second input-output port 57a2 of the polarization beam splitter 57a.

At the same time as the aforementioned operation, the longer-wavelength-side optical signal 42aC and the pump beam Pa input to the polarization beam splitter 57a are output from the second input-output port 57a2, and travel through a loop path to be input to the first input-output port 57a1 via the highly nonlinear fiber 59a and the polarization controller 58a as indicated by arrow Y6a in the direction opposite to arrow Y5a. In this loop path also, an L-band longer-wavelength-side optical signal 42aL is newly generated through four-wave mixing in a similar manner.

The two L-band longer-wavelength-side optical signals 42aL, which have been generated by traveling through the aforementioned loop path in both directions, are wavelength-multiplexed by the polarization beam splitter 57a. The resulting L-band longer-wavelength-side optical signal 42aL is output toward the input side as indicated by arrow Y7a and is extracted by the WDM coupler 56a, and is then output to the optical coupler 60.

On the shorter wavelength side also, a wavelength band conversion process similar to that for the longer wavelength side is performed.

That is, the longer-wavelength-side optical signal 42bC and the pump beam Pb input to the polarization beam splitter 57b are output from the first input-output port 57b1 of the polarization beam splitter 57b, and travel through a loop path to be input to the second input-output port 57b2 via the polarization controller 58b and the highly nonlinear fiber 59b as indicated by arrow Y5b.

In such a loop path, the longer-wavelength-side optical signal 42bC and the pump beam Pb output from the first input-output port 57b1 are polarization-controlled by the polarization controller 58b, and a four-wave mixed beam is generated by the highly nonlinear fiber 59b. Through such a process, an L-band shorter-wavelength-side optical signal 42bL is newly generated, and is input to the second input-output port 57b2 of the polarization beam splitter 57b together with the longer-wavelength-side optical signal 42bC and the pump beam Pb.

At the same time as the aforementioned operation, the longer-wavelength-side optical signal 42bC and the pump beam Pb from the second input-output port 57b2 of the polarization beam splitter 57b travel through a loop path indicated by arrow Y6b in the direction opposite to arrow Y5b. In this loop path also, an L-band shorter-wavelength-side optical signal 42bL is newly generated through four-wave mixing in a similar manner.

The two L-band shorter-wavelength-side optical signals 42bL, which have been generated by traveling through the aforementioned loop path in both directions, are wavelength-multiplexed by the polarization beam splitter 57b.

The resulting L-band shorter-wavelength-side optical signal 42*b*L is output toward the input side as indicated by arrow Y7*b* and is output to the optical coupler 60 via the WDM coupler 56*b*.

The optical coupler 60 couples the L-band longer-wavelength-side optical signal 42*a*L and the L-band shorter-wavelength-side optical signal 42*b*L, thereby providing the L-band optical signal 42. The L-band optical signal 42 is allocated to the L-band "LB" of the optical fiber 16.

Figure 7:
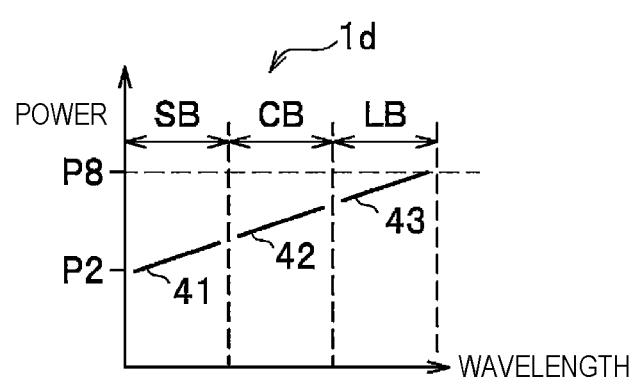
FIG. 7 is a wavelength spectrum chart of each optical signal that has undergone energy transition due to stimulated Raman scattering in a multiband transmission system of an embodiment.
Figure 8:
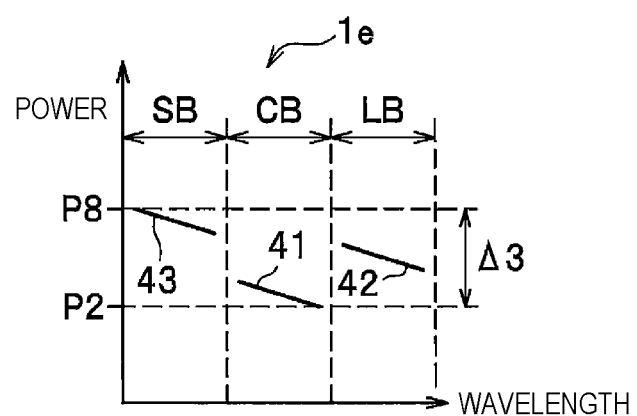
FIG. 8 is a wavelength spectrum chart when cyclic wavelength band permutation (cyclic permutation) is performed for converting optical signals into L1, S1, and C1 in a first sp.

In this manner, the C/L conversion unit 2*c* converts the C-band optical signal 42 (see the C-band "CB" in FIG. 7) from the optical amplifier 17*a*2 into the L-band optical signal 42 (see the L-band "LB" in FIG. 8).

<Operation of Embodiment>

Next, the operation of the multiband transmission system 10C will be described with reference to a flowchart in FIG. 5.

Figure 5:
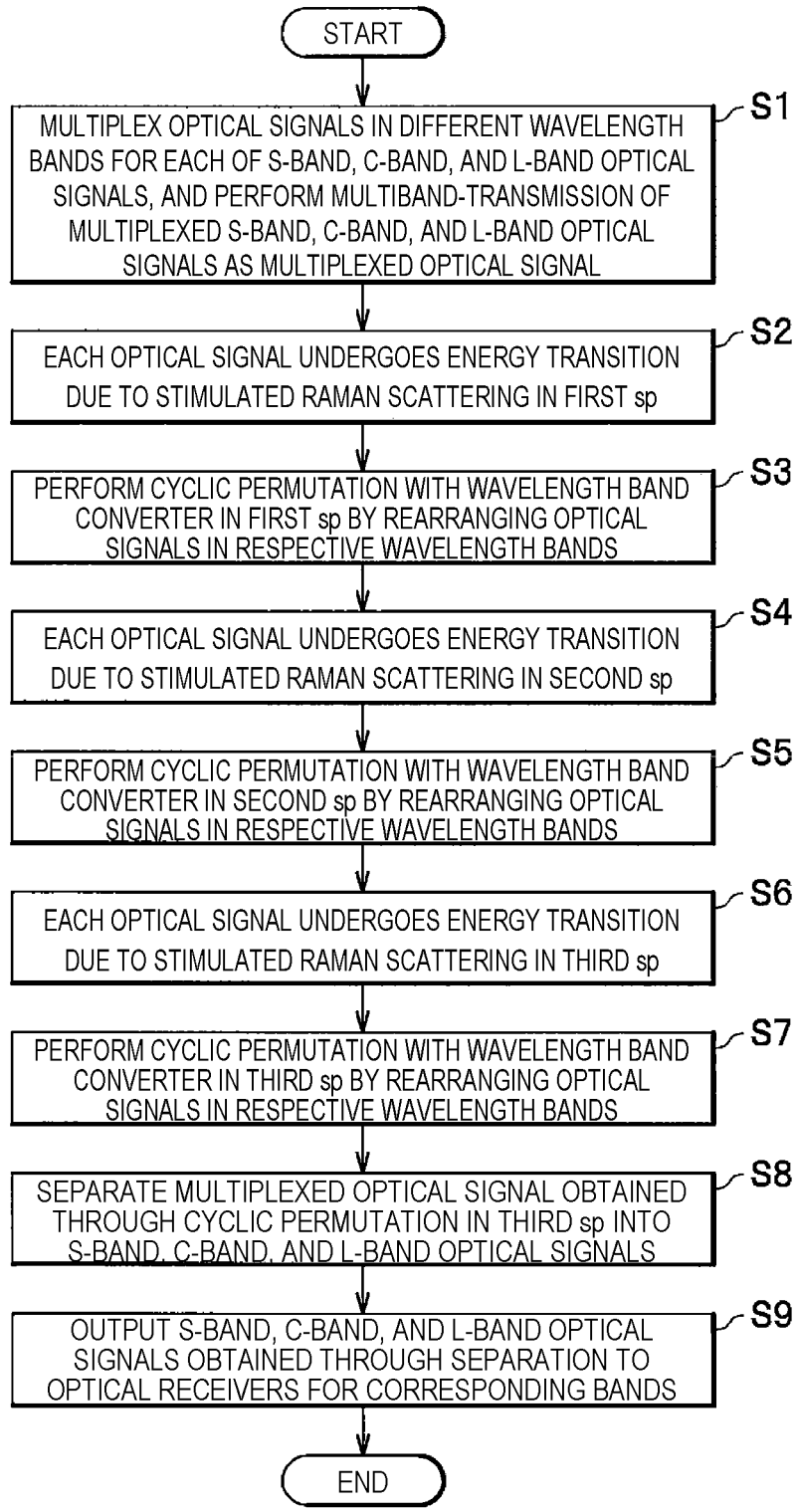
FIG. 5 is a flowchart for illustrating the operation of a multiband transmission system of an embodiment.
Figure 6:
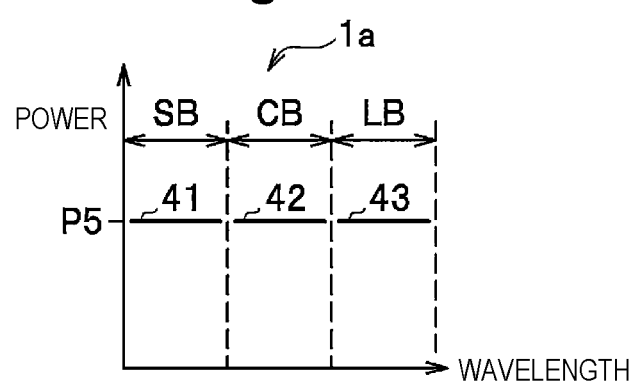
FIG. 6 is a wavelength spectrum chart of each of S-band, C-band, and L-band optical signals of a wavelength-multiplexed signal beam from a wavelength band multiplexer of an embodiment.

In step S1 illustrated in FIG. 5, S-band optical signals with different wavelengths transmitted from the S-band optical transmitters 11*a* to 11*n* illustrated in FIG. 1 are multiplexed by the MUX 14*a*, and become the S-band optical signal 41 (FIG. 6). C-band optical signals with different wavelengths transmitted from the C-band optical transmitters 12*a* to 12*n* are multiplexed by the MUX 14*b*, and become the C-band optical signal 42 (FIG. 6). L-band optical signals with different wavelengths transmitted from the L-band optical transmitters 13*a* to 13*n* are multiplexed by the MUX 14*c*, and become the L-band optical signal 43 (FIG. 6). That is, for each of the S-band, the C-band, and the L-band, optical signals with different wavelengths are multiplexed, and consequently, the S-band optical signal 41, the C-band optical signal 42, and the L-band optical signal 43 are obtained.

The wavelength band multiplexer 15*a*1 sequentially multiplexes the S-band optical signal 41, the C-band optical signal 42, and the L-band optical signal 43, which have been obtained through multiplexing as described above and further amplified by the optical amplifiers 17*t*, from the shorter wavelength side to the longer wavelength side of the bands of the optical fiber 16. That is, the wavelength band multiplexer 15*a*1 performs multiplexing by allocating the S-band optical signal 41 to the S-band "SB" of the optical fiber 16, allocating the C-band optical signal 42 to the C-band "CB," and allocating the L-band optical signal 43 to the L-band "LB" as illustrated in FIG. 6. Each of the multiplexed S-band optical signal 41, C-band optical signal 42, and L-band optical signal 43 has equal power P5. The wavelength band multiplexer 15*a*1 performs multiband transmission of the resulting wavelength-multiplexed signal beam 1*a* (FIG. 1) to the wavelength band separator 15*b*1 through the optical fiber 16. The separator 15*b*1 separates the wavelength-multiplexed signal beam 1*a* into the S-band, C-band, and L-band optical signals 41 to 43, and outputs them to the optical amplifiers 17*a* in the first sp.

In step S2, regarding each of the S-band, C-band, and L-band optical signals transmitted to the optical fiber 16 in the first sp and amplified by the optical amplifiers 17*a*, the optical signals with shorter to longer wavelengths undergo energy transition due to stimulated Raman scattering. Due to the energy transition, the power of each of the S-band, C-band, and L-band optical signals 41 to 43 becomes higher in an upward slanting manner in the direction from the optical signal 41 to the optical signal 43 as illustrated in FIG. 7.

That is, the power of each of the optical signals 41 to 43 becomes higher in an upward slanting manner from the power P2, which is lower than the power P5 (FIG. 6), to the power P8, which is higher than the power P5. The optical signals 41 to 43 with the power increased in an upward slanting manner are input to the wavelength band converter 32*a* in the first sp.

In step S3, the wavelength band converter 32*a* in the first sp performs cyclic permutation on the input optical signals 41 to 43 (FIG. 7) by respectively rearranging the optical signals 43, 41, and 42 in the bands SB, CB, and LB as illustrated in FIG. 8.

That is, the wavelength band converter 32*a* converts the L-band optical signal 43 in the L-band "LB" of the optical fiber 16 illustrated in FIG. 7 into the S-band optical signal 43 in the S-band "SB" illustrated in FIG. 8. In addition, the wavelength band converter 32*a* converts the S-band optical signal 41 in the S-band "SB" illustrated in FIG. 7 into the C-band optical signal 41 in the C-band "CB" illustrated in FIG. 8. Further, the wavelength band converter 32*a* converts the C-band optical signal 42 in the C-band "CB" illustrated in FIG. 7 into the L-band optical signal 42 in the L-band "LB" illustrated in FIG. 8.

Through such cyclic permutation, as seen in the power of each of the optical signals 41, 42, and 43 indicated by the left-to-right downward slanting line in FIG. 8, the spectrum of the wavelength band before the conversion is inverted. The power deviation between the minimum power P2 and the maximum power P8 of the optical signals 41 to 43 is indicated by 43.

Figure 9:
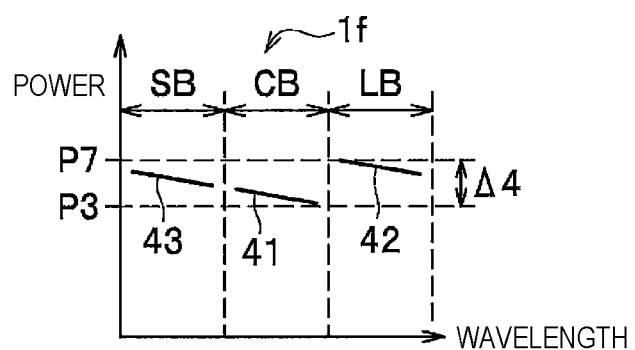
FIG. 9 is a wavelength spectrum chart of each optical signal when energy transition occurs due to stimulated Raman scattering in a second sp.

In step S4, a wavelength-multiplexed signal beam 1*e* (FIG. 8) output from the wavelength band converter 32*a* in the first sp is transmitted to the optical fiber 16 in the second sp, and is separated into the S-band, C-band, and L-band optical signals 41 to 43 by the separator 15*b*2, which are then amplified by the optical amplifiers 17*b*. Due to energy transition resulting from stimulated Raman scattering that occurs at this time, as illustrated in FIG. 9, the minimum power and the maximum power of the S-band, C-band, and L-band optical signals 41, 42, and 43 become P3 and P7, respectively. The power deviation 44 between the power P3 and the power P7 is smaller than the power deviation 43 in the first sp (FIG. 8). The optical signals 41 to 43 with the power deviation 44 are output to the wavelength band converter 32*b* in the second sp.

Figure 10:
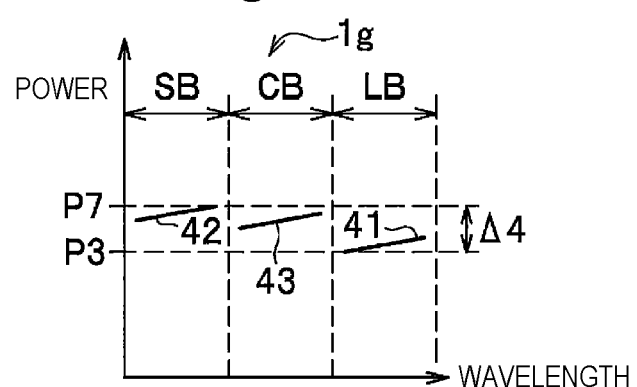
FIG. 10 is a wavelength spectrum chart when cyclic permutation is performed for converting optical signals into C1, L1, and S1 in a second sp.

In step S5, the wavelength band converter 32*b* in the second sp performs cyclic permutation on the optical signals 41, 42, and 43 (FIG. 9) by respectively rearranging the optical signals 42, 43, and 41 in the bands SB, CB, and LB as illustrated in FIG. 10. Through such cyclic permutation, as seen in the power of each of the optical signals 42, 43, and 41 indicated by the left-to-right upward slanting line, the spectrum of the wavelength band is inverted.

Figure 11:
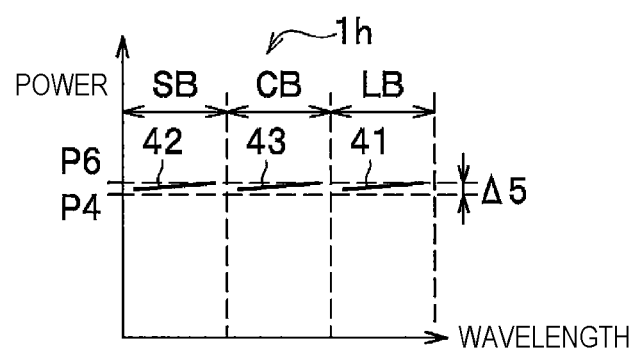
FIG. 11 is a wavelength spectrum chart of each optical signal when energy transition occurs due to stimulated Raman scattering in a third sp.

In step S6, a wavelength-multiplexed signal beam 1*g* (FIG. 10) output from the wavelength band converter 32*b* in the second sp is transmitted to the optical fiber 16 in the third sp, and is separated into the S-band, C-band, and L-band optical signals 41 to 43 by the separator 15*b*3, which are then amplified by the optical amplifiers 17*c*. Due to stimulated Raman scattering that occurs at this time, as illustrated in FIG. 11, the minimum power and the maximum power of the optical signals 42, 43, and 41 of a wavelength-multiplexed signal beam 1*h* become P4 and P6, respectively. The power deviation 45 between the power P4 and the power P6 is smaller than the power deviation 44 in the second sp (FIG. 10). The optical signals 41 to 43 with the power deviation 45 are output to the wavelength band converter 32*c* in the third sp.

Figure 12:
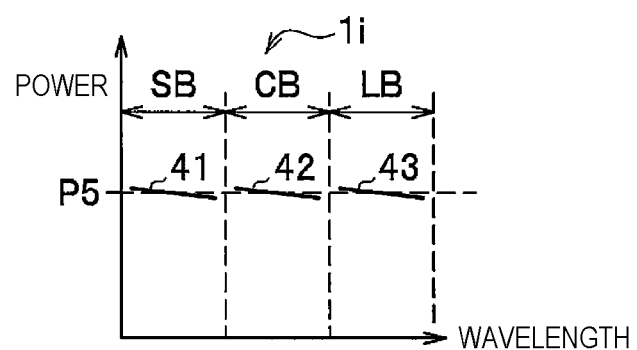
FIG. 12 is a wavelength spectrum chart when cyclic permutation is performed for converting optical signals into S1, C1, and L1 in a third sp.

In step S7, the wavelength band converter 32*c* in the third sp performs cyclic permutation on the optical signals 42, 43, and 41 (FIG. 11) by respectively rearranging the optical signals 41 to 43 in the bands SB, CB, and LB as illustrated in FIG. 12. Through such cyclic permutation, the spectrum of the wavelength band of each of the optical signals 41 to 43 is inverted, and the allocation of the optical signals 41 to 43 to the bands SB, CB, and LB returns to the original allocation on the transmission side illustrated in FIG. 6. Further, the power of each of the optical signals 41 to 43 illustrated in FIG. 12 becomes substantially the same power P5 of each of the optical signals 41 to 43 on the transmission side illustrated in FIG. 6.

In step S8, as illustrated in FIG. 1, a wavelength-multiplexed signal beam 1i from the wavelength band converter 32c in the third sp, which has substantially the same power P5 of the signal beam on the transmission side, is input to the wavelength band separator 15b4 via the optical fiber 16. The separator 15b4 separates the wavelength-multiplexed signal beam 1i into the S-band, C-band, and L-band optical signals 41, 42, and 43, and then outputs the S-band optical signal to the DEMUX 18a, outputs the C-band optical signal to the DEMUX 18b, and outputs the L-band optical signal to the DEMUX 18c.

In step S9, the DEMUX 18a demultiplexes the S-band optical signal 41 into optical signals with different wavelengths in the S-band, and outputs the resulting signals to the corresponding S-band optical receivers 21a to 21n. The DEMUX 18b demultiplexes the C-band optical signal 42 into optical signals with different wavelengths in the C-band, and outputs the resulting signals to the corresponding C-band optical receivers 22a to 22n. The DEMUX 18c demultiplexes the L-band optical signal 43 into optical signals with different wavelengths in the L-band, and outputs the resulting signals to the corresponding L-band optical receivers 23a to 23n.

Such an embodiment has illustrated the cyclic wavelength band permutation device 31 including the three wavelength band converters 32a to 32c corresponding to the number of the wavelength bands (3) of the three types of optical signals allocated to the optical fiber 16. In the present invention, it is acceptable as long as a cyclic wavelength band permutation device is used that includes two or more wavelength band converters in two spans (2sp) when the number of wavelength bands is two or more. That is, when the number of wavelength bands allocated to the optical transmission channel is M, the cyclic wavelength band permutation device includes M wavelength band converters in one sp. In addition, it is also possible to connect a plurality of cyclic wavelength band permutation devices 31, each forming a unit (1 ut) of a cyclic permutation process, in a cascade arrangement.

<Advantageous Effects of Embodiment>

(1) The cyclic wavelength band permutation device 31 of the present embodiment includes as many wavelength band converters 32 (i.e., the wavelength band converters 32a to 32c) as the wavelength bands (for example, three wavelength bands) of optical signals in one sp. The wavelength band converters 32 are individually connected to the output terminals of the corresponding optical amplifiers 17 (i.e., the optical amplifiers 17a to 17c).

With the wavelength band converters 32, a wavelength-multiplexed signal beam obtained by multiplexing the optical signals 41, 42, and 43 in different wavelength bands is multiband-transmitted through the optical fiber 16 while being amplified by the plurality of optical amplifiers 17. In such a case, the wavelength band converter 32a performs a cyclic permutation process of transitioning and rearranging (or converting) the optical signals (i.e., the optical signals 41 and 42) allocated to the shorter wavelength band (i.e., the S-band "SB" and the C-band "CB") side in the bands of the optical fiber 16 to/in the longer wavelength band (i.e., the C-band "CB" and the L-band "LB") side, and also transitioning and rearranging (or converting) the optical signal (i.e., the optical signal 43) allocated to the longest wavelength band (i.e., the S-band "SB") to/in the shortest wavelength band (i.e., the L-band "LB").

According to such a configuration, the following advantageous effects are obtained. Regarding the wavelength-multiplexed signal beam transmitted through the optical fiber 16 and amplified by the optical amplifiers 17, optical signals on the shorter wavelength side to the longer wavelength side undergo energy transition due to stimulated Raman scattering, with the result that the optical signal 41 on the shorter wavelength side has low power, the optical signal 42 on the longer wavelength side has medium power, and the optical signal 43 on the longest wavelength side has high power. Therefore, on the reception side, power deviation occurs between the short-wavelength optical signal 41 and the long-wavelength optical signal 43.

However, in the present embodiment, for the optical signals 41 to 43 in different wavelength bands of the wavelength-multiplexed signal beam output from the optical amplifiers 17, the cyclic permutation process allows the optical signal 43 in the longest wavelength band, which has high power due to energy transition, to be allocated to the shortest wavelength band, and also allows the optical signals 41 and 42 allocated to the shorter wavelength band side to be allocated to the longer wavelength band side. Such allocation allows the optical signal 43 with high power, the optical signal 41 with low power, and the optical signal 42 with medium power to be sequentially arranged in the bands of the optical fiber 16 from the shorter wavelength band side to the longer wavelength band side, as illustrated in FIG. 8.

When such optical signals are transmitted and amplified, energy transition occurs in the direction from the optical signal 43 with high power to the optical signal 41 with lower power and to the optical signal 42 with medium power, and also occurs in the direction from the optical signal 41 with low power to the optical signal 42 with medium power. Due to such energy transition, power deviation among the optical signals 43, 41, and 42 becomes small as illustrated in FIG. 9.

Such a cyclic permutation process is repeated using as many wavelength band converters 32 as the wavelength bands of the optical signals 41 to 43, whereby in the wavelength band converter 32 at the end of the transmission channel, as illustrated in FIG. 12, the optical signals 41, 42, and 43 return to their original band positions in the optical fiber 16 as of the beginning of transmission, and thus, there is no (or substantially no) power deviation among the optical signals 41, 42, and 43. Therefore, on the reception side, optical signals in the respective wavelength bands each having power equal to that at the beginning of transmission can be obtained. Accordingly, degradation in OSNR is substantially eliminated, which in turn can suppress a decrease in the transmission capacity of a wavelength-multiplexed signal beam.

In addition, since the cyclic permutation process is performed not through electrical control but through an optical process, it is possible to substantially eliminate power deviation on the reception side instantaneously even when dynamic power fluctuation occurs at the light speed. Therefore, a decrease in the transmission capacity of a wavelength-multiplexed signal beam can be suppressed.

Further, since the cyclic permutation process does not include a process of increasing or reducing the power of optical signals unlike in the conventional art, the process of suppressing power deviation can be performed efficiently. That is, according to the present embodiment, when multiband transmission is performed using the optical fiber 16, a decrease in the transmission capacity of a wavelength-multiplexed signal beam can be suppressed.

(2) As many wavelength band converters 32 as the wavelength bands of the optical signals 41, 42, and 43 are counted as a unit of a cyclic permutation process, and a plurality of groups of wavelength band converters 32, each group forming a unit of a cyclic permutation process, are connected in a cascade arrangement.

According to such a configuration, as the number of units of the wavelength band converters 32 is larger, power deviation among the optical signals 41, 42, and 43, which occurs due to energy transition, converges more in the direction in which the power deviation becomes smaller after the conversion. Therefore, a decrease in the transmission capacity of a wavelength-multiplexed signal beam can be further suppressed.

(3) Each of the wavelength band converters 32 is configured to, when a cyclic permutation process is performed, perform a process of reversing the spectral characteristics of the wavelength bands of the optical signals that have been converted into bands in the transition destination so that the spectral characteristics become opposite to those before the conversion.

According to such a configuration, the following operational advantages can be obtained. Among the plurality of wavelength band converters 32, odd-numbered wavelength band converters 32 counted from the transmission side provide opposite spectral characteristics of the wavelength bands of optical signals as described below. That is, when the power of optical signals before conversion has spectral characteristics of wavelength bands such that the power becomes higher from the shorter wavelength side to the longer wavelength side, the spectral characteristics become opposite upon transition (or conversion) of the optical signals to the other bands in the optical fiber 16.

That is, the power of the optical signal on the shorter wavelength side becomes high, and the power of the optical signal on the longer wavelength side becomes low. Therefore, energy transition occurs in the direction from the shorter wavelength band side to the longer wavelength band side. That is, since energy transition occurs in the direction from high power to low power, the high power decreases and the low power increases. Due to such energy transition, the power of the optical signal in each band of the optical fiber 16 converges in the direction in which the power is equalized more. That is, the power converges in the direction in which power deviation among the optical signals becomes smaller. The degree of the convergence herein is increased more as the system is configured to repeat more cyclic permutation processes as a unit ("1 ut" in FIG. 1).

(4) The multiband transmission system 10C has a configuration in which the cyclic wavelength band permutation device 31 according to any one of (1) to (3) above is connected in an inserted manner to the optical fiber 16 between a wavelength band multiplexer that performs multiband transmission of a wavelength-multiplexed signal beam, which has been obtained by multiplexing the optical signals 41, 42, and 43 in different wavelength bands, to the optical fiber 16 and a wavelength band separator that separates the multiband-transmitted optical signals 41, 42, and 43 into signals in the respective wavelength bands.

According to such a configuration, advantageous effects similar to those of the cyclic wavelength band permutation device 31 according to any one of (1) to (3) above can be obtained.

<Another Example of Embodiment>

Figure 13:
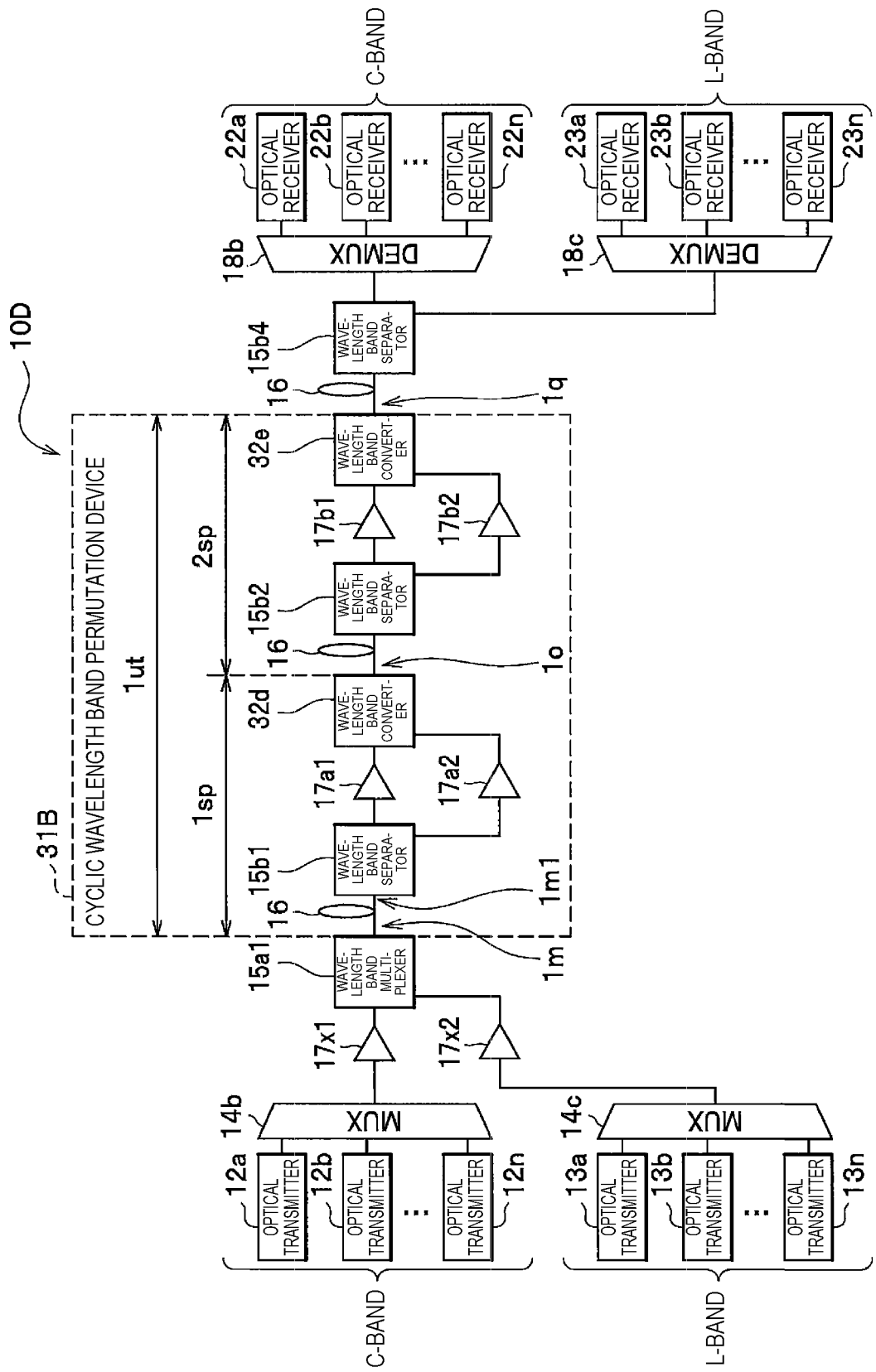
FIG. 13 is a block diagram illustrating the configuration of a multiband transmission system including a cyclic wavelength band permutation device according to another example of an embodiment.

FIG. 13 is a block diagram illustrating the configuration of a multiband transmission system 10D including a cyclic wavelength band permutation device 31B according to another example of an embodiment. The cyclic wavelength band permutation device 31B includes two wavelength band converters 32d and 32e when the number of wavelength bands allocated to an optical fiber 16 is two. It should be noted that the wavelength bands of two types of optical signals herein are the C-band and the L-band.

In the system 10D, the interval between the output terminal of a wavelength band multiplexer 15a1 and the output terminal of the first wavelength band converter 32d is a first span (1sp). The interval between the output terminal of the first wavelength band converter 32d and the output terminal of the second wavelength band converter 32e is a second span (2sp). The sum of the 1sp and the 2sp is a unit (1 ut) of a cyclic permutation process.

Figure 15:
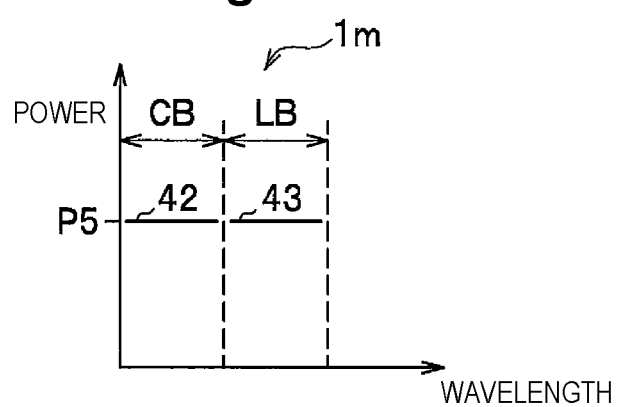
FIG. 15 is a wavelength spectrum chart of each of C-band and L-band optical signals of a wavelength-multiplexed signal beam from a wavelength band multiplexer according to another example.

It is defined that at the beginning of transmission through the optical fiber 16, as illustrated in FIG. 15, the band to which a C-band optical signal 42 is allocated is the C-band "CB," and the band to which an L-band optical signal 43 is allocated is the L-band "LB."

The cyclic wavelength band permutation device 31B illustrated in FIG. 13 includes the two wavelength band converters 32d and 32e, and performs a cyclic permutation process of converting (or rearranging) optical signals sequentially allocated to the bands of the optical fiber 16 from the shorter wavelength side to the longer wavelength side in a cyclic manner.

Figure 14:
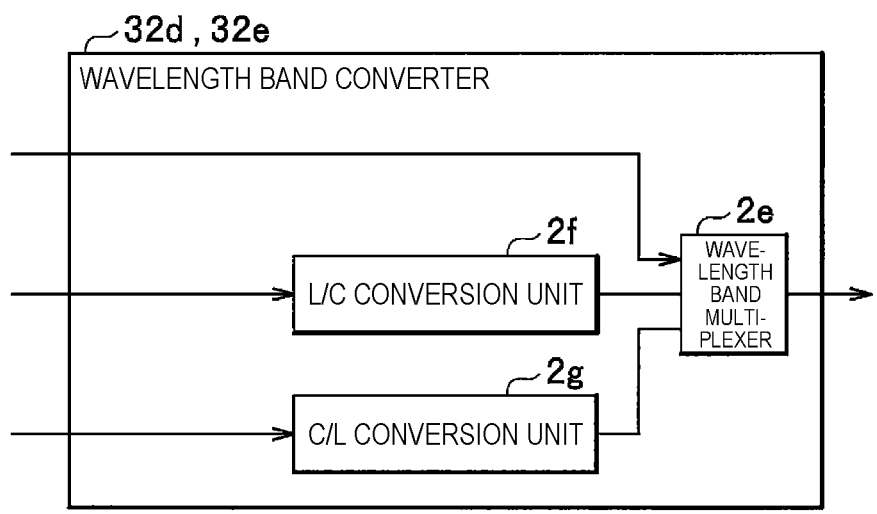
FIG. 14 is a block diagram illustrating the configuration of a wavelength band converter according to another example of an embodiment.

Each of the wavelength band converters 32d and 32e includes, as illustrated in FIG. 14, an L/C conversion unit 2f, a C/L conversion unit 2g, and a wavelength band multiplexer 2e.

Figure 17:
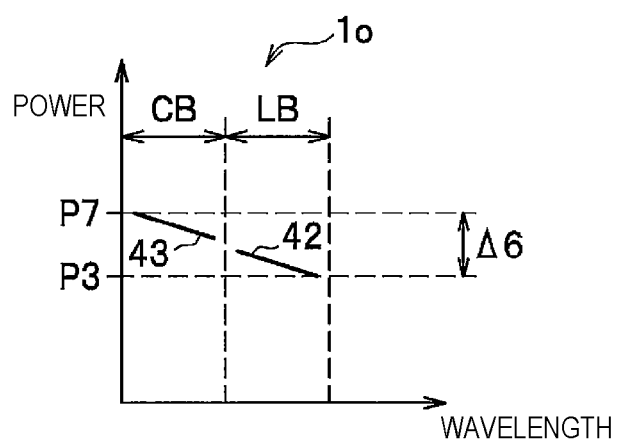
FIG. 17 is a wavelength spectrum chart when cyclic permutation is performed for converting optical signals into C1 and L1 in a first sp according to another example.

The L/C conversion unit 2f transitions the C-band optical signal 42 (FIG. 15) from an optical amplifier 17a1 to the L-band "LB," thereby converting the signal into an L-band optical signal 42 (FIG. 17). Accordingly, the power of the optical signal 42 is unchanged but its carrier becomes the L-band.

The C/L conversion unit 2g transitions the L-band optical signal 43 (FIG. 15) from an optical amplifier 17a2 into the C-band "CB," thereby converting the signal into a C-band optical signal 43 (FIG. 17). Accordingly, the power of the optical signal 43 is unchanged but its carrier becomes the C-band. In this manner, each of the conversion units 2f and 2g performs a cyclic permutation process of converting (or rearranging) the C-band and L-band optical signals in a cyclic manner.

The operation of such a system 10D will be described. First, C-band optical signals with different wavelengths transmitted from C-band optical transmitters 12a to 12n illustrated in FIG. 13 are multiplexed by a MUX 14b, and become the C-band optical signal 42. L-band optical signals with different wavelengths transmitted from L-band optical transmitters 13a to 13n are multiplexed by a MUX 14c, and become the L-band optical signal 43. That is, for each of the C-band and the L-band, optical signals with different wavelengths are multiplexed, and consequently, the C-band optical signal 42 and the L-band optical signal 43 are obtained.

As illustrated in FIG. 15, the wavelength band multiplexer 15a1 performs multiplexing by allocating the C-band optical signal 42 to the C-band "CB" of the optical fiber 16 and allocating the L-band optical signal 43 to the L-band "LB." Each of the multiplexed C-band optical signal 42 and L-band optical signal 43 has equal power P5. The wavelength band multiplexer 15a1 performs multiband transmission of the resulting wavelength-multiplexed signal beam 1m (FIG. 13) to the optical amplifiers 17a in the first sp through the optical fiber 16.

Next, the C-band optical signal 42 and the L-band optical signal 43, which have been transmitted to the optical fiber 16 in the first sp and amplified by the optical amplifiers 17a, undergo energy transition due to stimulated Raman scattering. Due to such energy transition, the power of each of the C1 optical signal 42 and the L1 optical signal 43 becomes higher in an upward slanting manner from C1 to L1 as illustrated in FIG. 16.

That is, the power of each of the C1 and L1 optical signals becomes higher in an upward slanting manner from power P3, which is lower than the power P5 (FIG. 15), to power P7, which is higher than the power P5. The resulting wavelength-multiplexed signal beam 10 with the power increased in an upward slanting manner is input to the wavelength band converter 32d in the first sp.

Next, the wavelength band converter 32d in the first sp performs cyclic permutation on the optical signals 42 and 43. That is, the wavelength band converter 32d converts the L-band optical signal 43 in the L-band "LB" illustrated in FIG. 16 into the C-band in the C-band "CB" illustrated in FIG. 17, and converts the C-band optical signal 42 in the C-band "CB" illustrated in FIG. 16 into the L-band in the L-band "LB" illustrated in FIG. 17.

Figure 16:
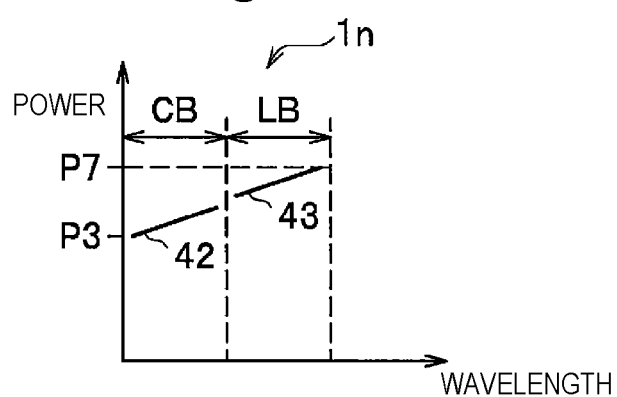
FIG. 16 is a wavelength spectrum chart of each optical signal that has undergone energy transition due to stimulated Raman scattering according to another example.

Through such cyclic permutation, as seen in the power of each of the optical signals 43 and 42 indicated by the left-to-right downward slanting line in FIG. 17, the spectrum of the wavelength band is inverted from that indicated by the slanting line in FIG. 16 (has opposite spectral characteristics). In addition, the power deviation 46 between the power P3 and the power P7 of the optical signals 43 and 42 remains the same as that before the conversion (FIG. 16).

Figure 18:
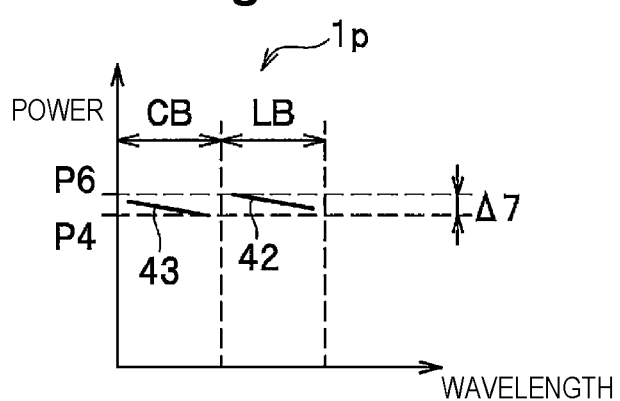
FIG. 18 is a wavelength spectrum chart of each optical signal when energy transition occurs due to stimulated Raman scattering in a second sp according to another example.

Next, the wavelength-multiplexed signal beam 10 output from the wavelength band converter 32d in the first sp is transmitted to the optical fiber 16 in the second sp, and is then separated into the C-band and L-band optical signals 42 and 43 by a separator 15b2, which are then amplified by optical amplifiers 17b. Due to energy transition resulting from stimulated Raman scattering that occurs at this time, as illustrated in FIG. 18, the minimum power and the maximum power of the C-band and L-band optical signals 43 and 42 become P4 and P6, respectively. The power deviation 47 between the power P4 and the power P6 is smaller than the power deviation 46 in the first sp (FIG. 17). The optical signals 42 and 43 with the power deviation 47 are input to the wavelength band converter 32e in the second sp.

Figure 19:
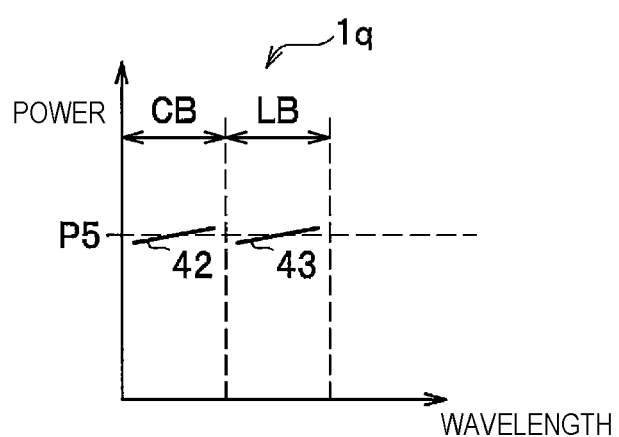
FIG. 19 is a wavelength spectrum chart when cyclic permutation is performed for converting optical signals into C1 and L1 in a second sp according to another example.

Next, the wavelength band converter 32e in the second sp performs cyclic permutation on the input optical signals 43 and 42 (FIG. 18) by respectively rearranging the optical signals 42 and 43 in the bands CB and LB as illustrated in FIG. 19. Through such cyclic permutation, the spectrum of the wavelength band of each of the optical signals 42 and 43 is inverted, and the allocation of the optical signals 42 and 43 to the bands CB and LB returns to the original allocation illustrated in FIG. 15. Further, the power of each of the optical signals 42 and 43 illustrated in FIG. 19 becomes substantially the same power P5 of each of the optical signals 42 and 43 on the transmission side illustrated in FIG. 15.

The resulting wavelength-multiplexed signal beam 1q illustrated in FIG. 19 is separated into C-band and L-band optical signals by a separator 15b4 illustrated in FIG. 13, which are then respectively output to C-band optical receivers 22a to 22n and L-band optical receivers 23a to 23n via DEMUXs 18b and 18c.

The cyclic wavelength band permutation device 31B with such a configuration can also obtain advantageous effects similar to those of the aforementioned cyclic wavelength band permutation device 31 (FIG. 1).

<Advantageous Effects>

(1a) A cyclic wavelength band permutation device of the present invention is a cyclic wavelength band permutation device including wavelength band converters. Specifically, when a wavelength-multiplexed signal beam obtained by multiplexing optical signals in different wavelength bands is multiband-transmitted through an optical fiber while being amplified by a plurality of optical amplifiers, the cyclic wavelength band permutation device includes as many wavelength band converters as the wavelength bands of the optical signals. Each wavelength band converter performs a cyclic permutation process of transitioning or converting an optical signal allocated to the shorter wavelength band side in the bands of the optical fiber to the longer wavelength band side, and also transitioning or converting an optical signal allocated to the longest wavelength band to the shortest wavelength band. Each wavelength band converter is connected to the output terminals of corresponding optical amplifiers among the plurality of optical amplifiers.

According to such a configuration, the following operational advantages are obtained. For optical signals in different wavelength bands of a wavelength-multiplexed signal beam output from the optical amplifiers, the cyclic permutation process allows the optical signal in the longest wavelength band, which has high power due to energy transition, to be allocated to the shortest wavelength band, and also allows the optical signals allocated to the shorter wavelength band side to be allocated to the longer wavelength band side. In such a case, an optical signal with high power, an optical signal with low power, and an optical signal with medium power are sequentially arranged in the bands of the optical fiber from the shorter wavelength band side.

When such optical signals are transmitted and amplified, energy transition occurs in the direction from the optical signal with high power to the optical signal with low power, and also occurs in the direction from the optical signal with lower power to the optical signal with medium power. Due to such energy transition, power deviation among the optical signals becomes small.

Such a cyclic permutation process is repeated using as many wavelength band converters as the wavelength bands of the optical signals, whereby in the wavelength band converter at the end of the transmission channel, the optical signals return to their original band positions in the optical fiber as of the beginning of transmission, and thus, there is substantially no power deviation among the optical signals. Therefore, on the reception side, optical signals in the respective wavelength bands each having power equal to that at the beginning of transmission can be obtained. Accordingly, degradation in OSNR is substantially eliminated, which in turn can suppress a decrease in the transmission capacity of a wavelength-multiplexed signal beam.

In addition, since the cyclic permutation process is performed not through electrical control but through an optical process, it is possible to substantially eliminate power deviation on the reception side instantaneously even when dynamic power fluctuation occurs at the light speed. Therefore, a decrease in the transmission capacity of a wavelength-multiplexed signal beam can be suppressed.

Further, since the cyclic permutation process does not include a process of increasing or reducing the power of optical signals unlike in the conventional art, the process of suppressing power deviation can be performed efficiently. That is, according to the present invention, when multiband transmission is performed using an optical fiber, a decrease in the transmission capacity of a wavelength-multiplexed signal beam can be suppressed.

(2a) In the cyclic wavelength band permutation device according to (1a) above, as many wavelength band converters as the wavelength bands of optical signals are counted as a unit of a cyclic permutation process, and a plurality of groups of wavelength band converters, each group forming a unit of a cyclic permutation process ("1 ut" in FIG. 1), are connected in a cascade arrangement.

According to such a configuration, as the number of units of the wavelength band converters is larger, power deviation among optical signals, which occurs due to energy transition, converges more in the direction in which the power deviation becomes smaller after the conversion. Therefore, a decrease in the transmission capacity of a wavelength-multiplexed signal beam can be further suppressed.

(3a) In the cyclic wavelength band permutation device according to (1a) or (2a) above, each of the wavelength band converters is configured to, when a cyclic permutation process is performed, perform a process of reversing the spectral characteristics of the wavelength bands of the optical signals that have been converted into bands in the transition destination so that the spectral characteristics become opposite to those before the conversion.

According to such a configuration, the following operational advantages can be obtained. Among the plurality of wavelength band converters, odd-numbered wavelength band converters counted from the transmission side provide opposite spectral characteristics of the wavelength bands of optical signals as described below. That is, when the power of optical signals before conversion has spectral characteristics of wavelength bands such that the power becomes higher from the shorter wavelength side to the longer wavelength side, the spectral characteristics become opposite upon transition (or conversion) of the optical signals to the other bands in the optical fiber. That is, the power of the optical signal on the shorter wavelength side becomes high, and the power of the optical signal on the longer wavelength side becomes low. Therefore, energy transition occurs in the direction from the shorter wavelength band side to the longer wavelength band side. That is, since energy transition occurs in the direction from high power to low power, the high power decreases and the low power increases. Due to such energy transition, the power of the optical signal in each band of the optical fiber converges in the direction in which the power is equalized more. That is, the power converges in the direction in which power deviation among the optical signals becomes smaller. The degree of the convergence herein is increased more as the system is configured to repeat more cyclic permutation processes as units.

(4a) The multiband transmission system has a configuration in which the cyclic wavelength band permutation device according to any one of (1a) to (3a) above is connected in an inserted manner to an optical fiber between a wavelength band multiplexer that performs multiband transmission of a wavelength-multiplexed signal beam, which has been obtained by multiplexing optical signals in different wavelength bands, to the optical fiber and a wavelength band separator that separates the multiband-transmitted optical signals into signals in the respective wavelength bands.

According to such a configuration, advantageous effects similar to those of the cyclic wavelength band permutation device 31 according to any one of (1a) to (3a) above can be obtained.

Besides, specific configurations can be changed as appropriate within the spirit and scope of the present invention.

REFERENCE SIGNS LIST

2a L/S conversion unit
2b S/C conversion unit
2c C/L conversion unit
2e Wavelength band multiplexer
10C, 10D Multiband transmission systems
15a Wavelength band multiplexer
15b Wavelength band separator
16 Optical fiber
17a to 17c Optical amplifiers
31, 31B Cyclic wavelength band permutation devices
32a to 32e Wavelength band converters
41, 42, 43 S-band, C-band, and L-band optical signals
51 WSS
52a, 52b Variable-wavelength light sources
53a, 53b Amplifiers
54a, 54b Polarization controllers
55a, 55b WDM couplers
57a, 57b Polarization beam splitters
58a, 58b Polarization controllers
59a, 59b Highly nonlinear fibers
60 Optical coupler

The invention claimed is:

1. A cyclic wavelength band permutation device comprising a plurality of wavelength band converters, the cyclic wavelength band permutation device configured to:
receive a wavelength-multiplexed signal beam, the wavelength-multiplexed signal beam obtained by multiplexing optical signals in different wavelength bands that is transmitted through an optical fiber while being amplified by a plurality of optical amplifiers;
perform, by each wavelength band converter of the plurality of wavelength band converters, a cyclic permutation process of (i) transitioning an optical signal of the wavelength-multiplexed signal beam allocated to a shorter wavelength band side in bands of the optical fiber and (ii) transitioning an optical signal of the wavelength-multiplexed signal beam allocated to a longest wavelength band to a shortest wavelength band, wherein the cyclic wavelength band permutation device comprises a number of the plurality of wavelength band converters that matches to a number of the wavelength bands of the optical signals, and
each wavelength band converter of the plurality of wavelength band converters comprises (i) a plurality of converters and (ii) a first wavelength band multiplexer, a number of the plurality of converters equivalent to the number of the wavelength bands of the optical signals, and each of the wavelength band converters is connected to output terminals of corresponding optical amplifiers among the plurality of optical amplifiers.

2. The cyclic wavelength band permutation device according to claim 1, wherein:
the number of the plurality of wavelength band converters that matches to the number of wavelength bands of the optical signals are counted as a unit of the cyclic permutation process, and a plurality of groups of wavelength band converters, each group forming a unit of the cyclic permutation process, are connected in a cascade arrangement.

3. The cyclic wavelength band permutation device according to claim 2, wherein each of the wavelength band converters is configured to, when the cyclic permutation process is performed, perform a process of reversing spectral characteristics of the wavelength bands of the optical signals that have been converted into bands in a transition destination so that the spectral characteristics become opposite to the spectral characteristics before the conversion.

4. A multiband transmission system comprising the cyclic wavelength band permutation device according to claim 1, the cyclic wavelength band permutation device being connected in an inserted manner to an optical fiber between a second wavelength band multiplexer and a wavelength band separator, the second wavelength band multiplexer configured to perform multiband transmission of a wavelength-multiplexed signal beam obtained by multiplexing optical signals in different wavelength bands to the optical fiber, and the wavelength band separator configured to separate the multiband-transmitted optical signals into signals in the respective wavelength bands.

5. The multiband transmission system according to claim 4, wherein:

the number of the plurality of wavelength band converters that matches to the number of wavelength bands of the optical signals are counted as a unit of the cyclic permutation process, and a plurality of groups of wavelength band converters, each group forming a unit of the cyclic permutation process, are connected in a cascade arrangement.

6. The multiband transmission system according to claim 5, wherein each of the wavelength band converters is configured to, when the cyclic permutation process is performed, perform a process of reversing spectral characteristics of the wavelength bands of the optical signals that have been converted into bands in a transition destination so that the spectral characteristics become opposite to the spectral characteristics before the conversion.

7. The cyclic wavelength band permutation device according to claim 1, wherein each converter of the plurality of converters is configured to output the transitioned optical signal of the wavelength-multiplexed signal beam to the first wavelength band multiplexer in a respective wavelength band converter.

8. A cyclic wavelength band permutation method performed with a cyclic wavelength band permutation device including a plurality of wavelength band converters, the cyclic wavelength band permutation method comprising:

receiving a wavelength-multiplexed signal beam, the wavelength-multiplexed signal beam obtained by multiplexing optical signals in different wavelength bands that is transmitted through an optical fiber while being amplified by a plurality of optical amplifiers;

performing, by each of the wavelength band converters, a cyclic permutation process of (i) transitioning an optical signal of the wavelength-multiplexed signal beam allocated to a shorter wavelength band side in bands of the optical fiber and (ii) transitioning an optical signal of the wavelength-multiplexed signal beam allocated to a longest wavelength band to a shortest wavelength band wherein the cyclic wavelength band permutation device comprises a number of the plurality of wavelength band converters that matches to a number of the wavelength bands of the optical signals, and each wavelength band converter of the plurality of wavelength band converters comprises (i) a plurality of converters and (ii) a first wavelength band multiplexer, a number of the plurality of converters equivalent to the number of the wavelength bands of the optical signals, and each of the wavelength band converters is connected to output terminals of corresponding optical amplifiers among the plurality of optical amplifiers.

9. The cyclic wavelength band permutation method according to claim 8, further comprising:

counting as a unit of the cyclic permutation process the number of wavelength band converters that matches to the number of the wavelength bands of the optical signals, and connecting, in a cascade arrangement, a plurality of groups of wavelength band converters, each group forming a unit of the cyclic permutation process.

10. The cyclic wavelength band permutation method according to claim 9, further comprising:

reversing spectral characteristics of the wavelength bands of the optical signals that have been converted into bands in a transition destination so that the spectral characteristics become opposite to the spectral characteristics before the conversion.

* * * * *